US012631336B2

(12) United States Patent
Donnelly et al.

(10) Patent No.: US 12,631,336 B2
(45) Date of Patent: *May 19, 2026

(54) IGNITION-BASED PROTOCOLS FOR PELLET GRILLS

(71) Applicant: Weber-Stephen Products LLC, Palatine, IL (US)

(72) Inventors: Brian C. Donnelly, Naperville, IL (US); Ryan P. Lundberg, Des Plaines, IL (US); Ethan Albrecht, Chicago, IL (US); David Eckhardt, Oswego, IL (US); Laasya P. Vadlamani, Wheeling, IL (US)

( * ) Notice: Subject to any disclaimer, the term of this patent is extended or adjusted under 35 U.S.C. 154(b) by 398 days.

This patent is subject to a terminal disclaimer.

(21) Appl. No.: 18/494,831

(22) Filed: Oct. 26, 2023

(65) Prior Publication Data

US 2024/0053018 A1     Feb. 15, 2024

Related U.S. Application Data

(62) Division of application No. 18/177,645, filed on Mar. 2, 2023, now Pat. No. 11,885,499, which is a division (Continued)

(51) Int. Cl.
*F24B 1/02* (2006.01)
*A47J 36/32* (2006.01)
(Continued)

(52) U.S. Cl.
CPC .............. *F24B 1/028* (2013.01); *A47J 36/321* (2018.08); *A47J 37/0704* (2013.01);
(Continued)

(58) Field of Classification Search
CPC .......... F24B 1/207; F24B 1/003; F24B 1/028; F24B 13/04; F23Q 7/02; G07C 3/10;
(Continued)

(56) References Cited

U.S. PATENT DOCUMENTS

| | | | |
|---|---|---|---|
| 3,361,184 A | 1/1968 | Elzy | |
| 4,520,740 A | 6/1985 | Carpenter | |

(Continued)

FOREIGN PATENT DOCUMENTS

| | | | |
|---|---|---|---|
| CA | 3037934 A1 | 6/2019 | |
| CN | 207152494 U | 3/2018 | |

(Continued)

OTHER PUBLICATIONS

China National Intellectual Property Administration, "First Office Action," issued in connection with Chinese Patent Application No. 202080094915.7, dated Nov. 11, 2024, 32 pages (including machine-generated translation).

(Continued)

*Primary Examiner* — Alfred Basichas
(74) *Attorney, Agent, or Firm* — Avantech Law, LLP

(57) ABSTRACT

Pellet grills including a control system that implements, manages, and/or controls various ignition-based protocols are disclosed. An example pellet grill includes a cooking chamber, a burn pot, an ignitor, and a controller. The ignitor extends into the burn pot and is configured to ignite pellet fuel located within the burn pot. The controller is configured to detect a temperature pattern of the cooking chamber corresponding to a flame out condition of the burn pot. The controller is further configured, in response to detecting the temperature pattern, to command the ignitor to activate during a first duration. The controller is further configured to determine, following expiration of the first duration, whether a temperature of the cooking chamber increased during the first duration. The controller is further configured, in response to determining that the temperature has not increased during the first duration, to command the ignitor to activate during a second duration.

20 Claims, 18 Drawing Sheets

Related U.S. Application Data of application No. 16/926,271, filed on Jul. 10, 2020, now Pat. No. 11,624,505.

(60) Provisional application No. 62/990,788, filed on Mar. 17, 2020.

(51) Int. Cl.
| | |
|---|---|
| *A47J 37/07* | (2006.01) |
| *F23Q 7/02* | (2006.01) |
| *F24B 1/00* | (2006.01) |
| *F24B 13/04* | (2006.01) |
| *G07C 3/10* | (2006.01) |

(52) U.S. Cl.
CPC .............. *A47J 37/079* (2013.01); *F23Q 7/02* (2013.01); *F24B 1/003* (2013.01); *F24B 13/04* (2013.01); *G07C 3/10* (2013.01)

(58) Field of Classification Search
CPC .... A47J 36/321; A47J 37/0704; A47J 37/079; Y02A 40/928
See application file for complete search history.

(56) References Cited

U.S. PATENT DOCUMENTS

| | | | |
|---|---|---|---|
| 4,619,209 A | 10/1986 | Traeger et al. |
| 4,823,684 A | 4/1989 | Traeger et al. |
| 4,922,889 A | 5/1990 | Nuesmeyer et al. |
| 5,123,360 A | 6/1992 | Burke et al. |
| 5,133,266 A | 7/1992 | Cullen |
| 5,137,010 A | 8/1992 | Whitfield et al. |
| 5,206,484 A | 4/1993 | Issartel |
| 5,285,738 A | 2/1994 | Cullen |
| 5,295,474 A | 3/1994 | Whitfield et al. |
| 5,383,446 A | 1/1995 | Whitfield |
| 5,429,110 A | 7/1995 | Burke et al. |
| 5,488,943 A | 2/1996 | Whitfield et al. |
| 5,617,841 A | 4/1997 | Whitfield et al. |
| 5,730,114 A | 3/1998 | Fabrikant et al. |
| 5,873,356 A | 2/1999 | Vossler et al. |
| 6,155,160 A | 12/2000 | Hochbrueckner |
| 6,222,445 B1 | 4/2001 | Beckhusen |
| 6,223,737 B1 | 5/2001 | Buckner |
| 6,336,449 B1 | 1/2002 | Drisdelle et al. |
| 6,405,662 B1 | 6/2002 | Williams et al. |
| 6,507,507 B2 | 1/2003 | Tokunaga et al. |
| 6,643,152 B2 | 11/2003 | Tokunaga et al. |
| 6,930,283 B2 | 8/2005 | Reissner et al. |
| 7,318,431 B1 | 1/2008 | Holtan et al. |
| 7,530,351 B2 | 5/2009 | Leverty |
| 7,621,227 B2 | 11/2009 | Sterr |
| 7,665,406 B2 | 2/2010 | Krumrei |
| 7,721,661 B2 | 5/2010 | Nelson et al. |
| 7,900,553 B1 | 3/2011 | Maurin |
| 8,118,019 B2 | 2/2012 | DeMars et al. |
| 8,210,110 B2 | 7/2012 | Nelson et al. |
| 8,322,331 B2 | 12/2012 | Swanson |
| 8,730,038 B2 | 5/2014 | Durian |
| 8,800,542 B1 | 8/2014 | Kennington |
| 8,925,714 B1 | 1/2015 | Buser |
| 8,931,400 B1 | 1/2015 | Allen |
| 8,931,707 B2 | 1/2015 | Wilnechenko et al. |
| 9,423,178 B2 | 8/2016 | Mardikian |
| 9,427,107 B2 | 8/2016 | Reinhart |
| 9,439,530 B2 | 9/2016 | Logan et al. |
| 9,585,518 B1 | 3/2017 | Phillips |
| 9,759,429 B2 | 9/2017 | Tucker |
| 9,799,199 B2 | 10/2017 | Allen |
| 9,814,354 B2 | 11/2017 | McAdams et al. |
| 9,913,559 B2 | 3/2018 | Polter et al. |
| 9,928,672 B2 | 3/2018 | Jablokov et al. |
| 9,959,728 B2 | 5/2018 | True |
| 9,980,321 B2 | 5/2018 | Sorenson et al. |
| 10,036,554 B2 | 7/2018 | Mackle et al. |
| 10,092,135 B2 | 10/2018 | DeBruler |
| 10,105,007 B2 | 10/2018 | Colston et al. |
| 10,158,720 B2 | 12/2018 | Colston |
| 10,218,833 B2 | 2/2019 | Colston |
| 10,331,116 B2 | 6/2019 | Burkhardt et al. |
| 10,339,783 B2 | 7/2019 | Allen, Sr. |
| 10,426,295 B2 | 10/2019 | McAdams et al. |
| 10,455,022 B2 | 10/2019 | Colston |
| 10,455,979 B2 | 10/2019 | Colston et al. |
| 10,491,738 B2 | 11/2019 | Colston |
| 10,517,429 B2 | 12/2019 | West et al. |
| 11,248,801 B2 | 2/2022 | Donnelly et al. |
| 11,359,817 B2 | 6/2022 | Donnelly et al. |
| 11,371,712 B2 | 6/2022 | Donnelly et al. |
| 11,624,505 B2 | 4/2023 | Donnelly et al. |
| 11,885,499 B2 | 1/2024 | Donnelly et al. |
| 2004/0226550 A1 | 11/2004 | Hutton et al. |
| 2007/0157858 A1 | 7/2007 | Gagner et al. |
| 2007/0215021 A1 | 9/2007 | Krumrei |
| 2009/0293860 A1 | 12/2009 | Carlson |
| 2011/0048398 A1 | 3/2011 | Christensen et al. |
| 2012/0008457 A1 | 1/2012 | Neier et al. |
| 2012/0206266 A1 | 8/2012 | Moons |
| 2013/0298894 A1 | 11/2013 | Kleinsasser |
| 2014/0259895 A1 | 9/2014 | Mason |
| 2014/0326232 A1 | 11/2014 | Traeger |
| 2014/0326233 A1 | 11/2014 | Traeger |
| 2015/0064314 A1 | 3/2015 | Manuel et al. |
| 2015/0089489 A1 | 3/2015 | Sarkar et al. |
| 2015/0176558 A1 | 6/2015 | Glugla et al. |
| 2015/0213009 A1 | 7/2015 | Nonaka et al. |
| 2015/0282668 A1 | 10/2015 | Zhu et al. |
| 2016/0037966 A1 | 2/2016 | Chin et al. |
| 2016/0081515 A1 | 3/2016 | Aboujassoum et al. |
| 2016/0141865 A1 | 5/2016 | Drake et al. |
| 2016/0230992 A1 | 8/2016 | Sweet et al. |
| 2016/0327263 A1 | 11/2016 | Traeger |
| 2016/0327281 A1* | 11/2016 | Bhogal .................. F24C 7/087 |
| 2016/0334106 A1 | 11/2016 | Reinhart |
| 2016/0335874 A1 | 11/2016 | Allen, Sr. |
| 2016/0374501 A1 | 12/2016 | Logan et al. |
| 2017/0065124 A1 | 3/2017 | Colston |
| 2017/0067649 A1 | 3/2017 | Colston |
| 2017/0074522 A1 | 3/2017 | Cheng |
| 2017/0135159 A1 | 5/2017 | Sorenson et al. |
| 2017/0164783 A1 | 6/2017 | Sauerwein et al. |
| 2017/0176018 A1 | 6/2017 | Traeger |
| 2017/0211816 A1 | 7/2017 | Luckhardt et al. |
| 2017/0238751 A1 | 8/2017 | Vengroff |
| 2017/0343218 A1 | 11/2017 | Tucker |
| 2018/0005508 A1 | 1/2018 | Allen, Sr. |
| 2018/0005509 A1 | 1/2018 | Allen, Sr. |
| 2018/0007738 A1 | 1/2018 | Knappenberger et al. |
| 2018/0007739 A1 | 1/2018 | Knappenberger et al. |
| 2018/0008093 A1 | 1/2018 | Parker et al. |
| 2018/0070772 A1 | 3/2018 | McAdams et al. |
| 2018/0146824 A1 | 5/2018 | Kim et al. |
| 2018/0168397 A1 | 6/2018 | Colston |
| 2018/0213970 A1 | 8/2018 | Colston |
| 2018/0242772 A1 | 8/2018 | Jenkins et al. |
| 2019/0117017 A1 | 4/2019 | West et al. |
| 2019/0133374 A1 | 5/2019 | McAdams et al. |
| 2019/0150663 A1 | 5/2019 | Colston et al. |
| 2019/0282032 A1 | 9/2019 | Colston et al. |
| 2019/0289117 A1 | 9/2019 | Colston |
| 2019/0290064 A1 | 9/2019 | Colston et al. |
| 2019/0290066 A1 | 9/2019 | Colston |
| 2020/0214503 A1 | 7/2020 | Altenritter |

FOREIGN PATENT DOCUMENTS

| | | |
|---|---|---|
| CN | 108006710 A | 5/2018 |
| CN | 208017401 | 10/2018 |
| JP | 2004115247 | 4/2004 |
| JP | 2005090802 | 4/2005 |
| JP | 2015223330 A | 12/2015 |
| JP | 2018538703 | 12/2018 |
| KR | 20000042587 | 7/2000 |

(56)                    References Cited

FOREIGN PATENT DOCUMENTS

| KR | 101009285 | 1/2011 |
| KR | 101347212 | 1/2014 |
| KR | 101375523 | 3/2014 |
| WO | 2013116946 | 8/2013 |
| WO | 2017161254 | 9/2017 |

OTHER PUBLICATIONS

China National Intellectual Property Administration, "Notice of Allowance," issued in connection with Chinese Patent Application No. 202080094915.7, dated Jan. 20, 2025, 5 pages (including machine-generated translation).

Canadian Intellectual Property Office, "Office Action," issued in connection with Canadian Patent Application No. 3,164,968, dated Sep. 12, 2024, 3 pages.

International Searching Authority, "International Search Report and Written Opinion," issued in connection with International Patent Application No. PCT/US2020/042077, dated Jan. 5, 2021, 18 pages.

International Bureau, "International Preliminary Report on Patentability," issued in connection with International Patent Application No. PCT/US2020/042077, mailed Sep. 29, 2022, 13 pages.

United States Patent and Trademark Office, "Requirement for Restriction and/or Election", issued in connection with U.S. Appl. No. 16/926,271, filed Aug. 23, 2022, 6 pages.

United States Patent and Trademark Office, "Non-Final Rejection", issued in connection with U.S. Appl. No. 16/926,271, filed Oct. 20, 2022, 7 pages.

United States Patent and Trademark Office, "Notice of Allowance and Fee(s) Due", issued in connection with U.S. Appl. No. 16/926,271, filed Dec. 1, 2022, 5 pages.

United States Patent and Trademark Office, "Notice of Allowance and Fee(s) Due", issued in connection with U.S. Appl. No. 18/177,645, filed Sep. 21, 2023, 7 pages.

Australian Government, IP Australia, "Examination Report No. 1," issued in connection with Australian Patent Application No. 2020437162, dated Aug. 17, 2023, 5 pages.

Australian Government, IP Australia, "Notice of Acceptance," issued in connection with Australian Patent Application No. 2020437162, dated Mar. 2, 2024, 3 pages.

Canadian Intellectual Property Office, "Office Action," issued in connection with Canadian Patent Application No. 3,164,968, dated Sep. 27, 2023, 5 pages.

European Patent Office, "Partial Supplementary European Search Report," issued in connection with European Patent Application No. 20925579.3, dated Feb. 22, 2024, 11 pages.

European Patent Office, "Extended European Search Report," issued in connection with European Patent Application No. 20925579.3, dated Jun. 21, 2024, 14 pages.

* cited by examiner

SECTION A-A

SECTION B-B

IGNITION-BASED PROTOCOLS FOR PELLET GRILLS

RELATED APPLICATIONS

This application is a divisional of U.S. patent application Ser. No. 18/177,645, filed Mar. 2, 2023, which is a divisional of U.S. patent application Ser. No. 16/926,271, filed Jul. 10, 2020, which claims priority to U.S. Provisional Patent Application No. 62/990,788, filed Mar. 17, 2020, all of which are entitled "Ignition-Based Protocols for Pellet Grills." The entireties of U.S. patent application Ser. No. 18/177,645, U.S. patent application Ser. No. 16/926,271, and U.S. Provisional Patent Application No. 62/990,788 are hereby incorporated by reference herein.

FIELD OF THE DISCLOSURE

This disclosure relates generally to grills and, more specifically, to ignition-based protocols and/or processes for pellet grills.

BACKGROUND

Pellet grills are electronically-controlled cooking devices that are configured to cook (e.g., smoke, grill, bake, roast, broil, sear, and/or otherwise heat) food items located within (e.g., placed on one or more cooking grate(s) positioned within) a cooking chamber of the pellet grill. The controllable electronic components of the pellet grill can be powered via AC power (e.g., supplied to the pellet grill via household electricity or wall power) or DC power (e.g., supplied via an on-board or connected battery and/or DC power supply).

Conventional pellet grills store a volume of combustible pellet fuel (e.g., wood-based pellets) in a hopper that is mounted and/or coupled to the pellet grill. A motor-driven auger in communication with an exit opening of the hopper feeds and/or supplies the pellet fuel from the hopper into a burn pot of the pellet grill in a controlled and/or automated manner. The speed, rate, and/or duty cycle of the auger is typically based on a user-selected temperature (e.g., a temperature setpoint) that is established and/or desired for the cooking chamber of the pellet grill. Pellet fuel that is deposited in the burn pot can initially be ignited via an electronic starter of the pellet grill.

Combustion and/or burning of the pellet fuel within the burn pot produces, generates, and/or outputs heat which is subsequently distributed throughout the cooking chamber in a manner that causes the food items located within the cooking chamber to gradually become cooked. A motor-driven fan is typically implemented to assist with combusting the pellet fuel, and/or to assist with distributing and/or circulating heat (e.g., as may be produced by the combusted pellet fuel) throughout the cooking chamber.

Figure 1:
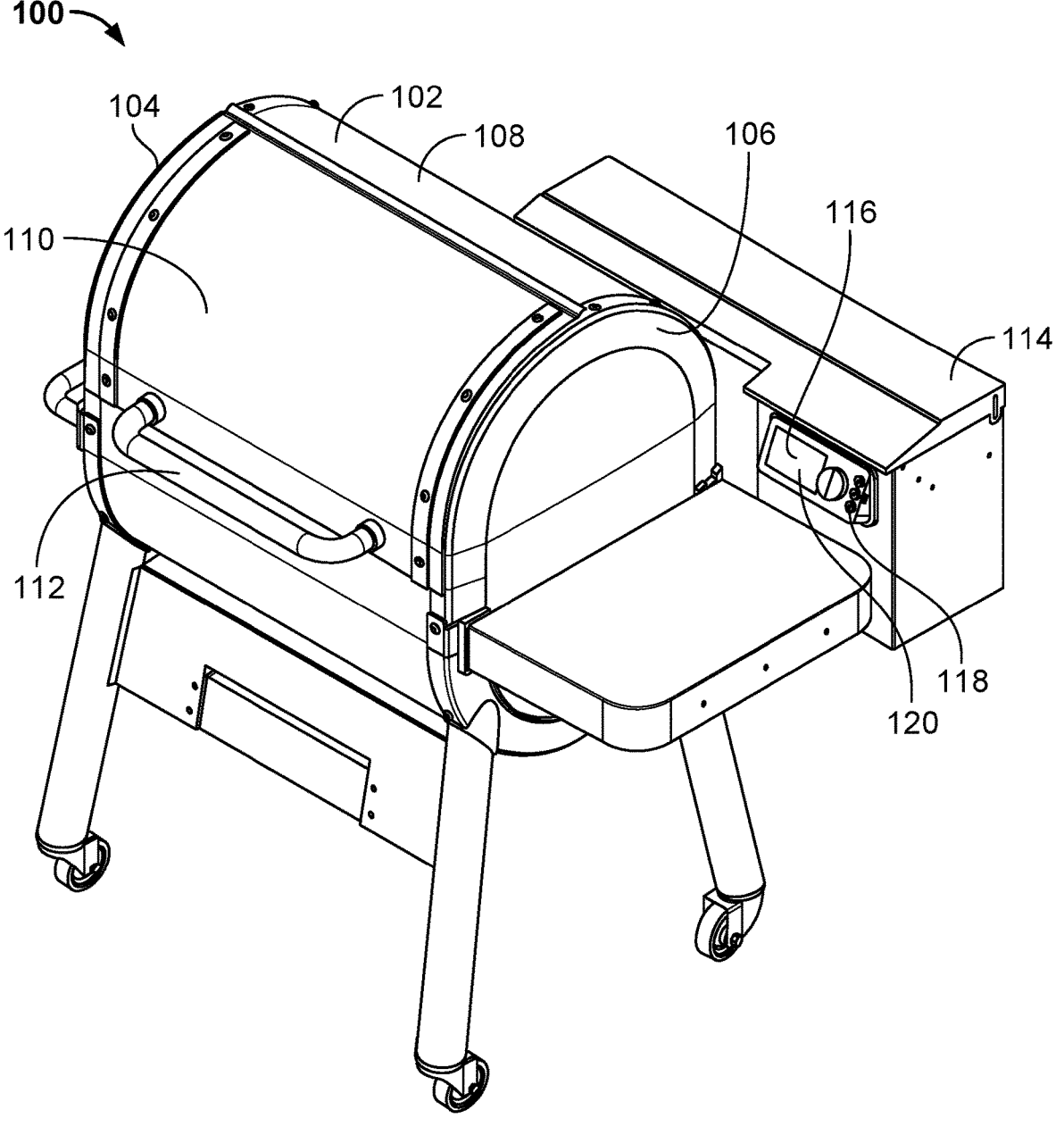
FIG. 1 is a perspective view of an example pellet grill constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example pellet grills disclosed herein include a control system that implements, manages, and/or controls various ignition-based protocols and/or processes which are advantageous to the operation and/or use of a pellet grill. In some examples, the control system implements, manages, and/or controls the ignition-based protocols and/or processes disclosed herein in connection with an engine of the pellet grill. In some examples, the engine includes a burn pot, an ignitor extending into the burn pot, an auger structured to deliver pellet fuel to the burn pot, an auger motor structured to drive the auger, and a fan structured to generate an airflow to be directed toward the burn pot. In some examples, the ignitor is a controllable, DC-powered glow plug that operates in response to data, commands and/or signals received from the control system of the pellet grill. In some examples, the auger motor is a controllable, DC-powered, variable-speed electric motor that operates in response to data, commands and/or signals received from the control system of the pellet grill. In some examples, the fan is a controllable, DC-powered, variable-speed electric motor fan that operates in response to data, commands and/or signals received from the control system of the pellet grill.

In some disclosed examples, the control system of the pellet grill implements, manages and/or controls an ignition-based startup protocol and/or process in connection with the engine. The control system is configured to detect the existence of a failed startup, as may be indicated by a failure of the temperature within a cooking chamber of the pellet grill to rise above a threshold temperature prior to the expiration of a predetermined duration and/or time period associated with an initial activation of an ignitor of the pellet grill. In some examples, the failed startup is detected based on data that is sensed, measured and/or detected by a temperature sensor of the pellet grill. In response to detecting the failed startup, the control system commands the ignitor of the engine to activate (e.g., re-activate) with the intent of causing pellet fuel present in the burn pot of the engine to initiate and/or resume combustion and/or burning.

In some disclosed examples, the control system generates (e.g., in the form of a command, message, signal, etc.) one or more notification(s) and/or alert(s) to be presented locally on a user interface of the pellet grill in connection with detecting the failed startup. The notification(s) and/or alert(s) may indicate, for example, that a failed startup has been detected, that the failed startup has been remedied successfully, and/or that the failed startup has not been remedied successfully. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

In some disclosed examples, the control system of the pellet grill additionally or alternatively implements, manages and/or controls an ignition-based flame out detection protocol and/or process in connection with the engine. The control system is configured to detect the existence of a flame out condition (e.g., an unintended cessation of fuel combustion), as may be indicated by a continually declining temperature of the cooking chamber over a period of time while the auger of the engine is actively attempting to feed and/or supply pellet fuel to the burn pot of the engine. In some examples, the flame out condition is detected based on data that is sensed, measured and/or detected by a temperature sensor of the pellet grill. In response to detecting the flame out condition, the control system commands the ignitor of the engine to activate (e.g., re-activate) with the intent of causing pellet fuel present in the burn pot of the engine to resume combustion and/or burning.

In some disclosed examples, the control system generates (e.g., in the form of a command, message, signal, etc.) one or more notification(s) and/or alert(s) to be presented locally on a user interface of the pellet grill in connection with detecting the flame out condition. The notification(s) and/or alert(s) may indicate, for example, that a flame out condition has been detected, that the flame out condition has been remedied successfully, and/or that the flame out condition has not been remedied successfully. The control system can additionally or alternatively cause the generated notification(s) and/or alert(s) to be wirelessly transmitted from the pellet grill to a remote device (e.g., a cloud server, a smartphone, a tablet, a laptop computer, a personal computer, etc.) for presentation and/or analysis thereon.

The above-identified features as well as other advantageous features of the disclosed pellet grills are further described below in connection with the figures of the application. Certain aspects of the disclosed pellet grills are commonly described in U.S. Provisional Patent Application No. 62/796,861, filed Jan. 25, 2019, U.S. Provisional Patent Application No. 62/891,011, filed Aug. 23, 2019, U.S. patent application Ser. No. 16/677,874, filed Nov. 8, 2019, U.S. patent application Ser. No. 16/677,914, filed Nov. 8, 2019, U.S. patent application Ser. No. 16/677,931, filed Nov. 8, 2019, U.S. patent application Ser. No. 16/677,938, filed Nov. 8, 2019, U.S. patent application Ser. No. 16/677,959, filed Nov. 8, 2019, U.S. patent application Ser. No. 16/677,980, filed Nov. 8, 2019, U.S. patent application Ser. No. 16/677, 995, filed Nov. 8, 2019, U.S. patent application Ser. No. 16/678,006, filed Nov. 8, 2019, and U.S. patent application Ser. No. 16/678,022, filed Nov. 8, 2019, each of which is hereby incorporated by reference herein in its entirety.

Figure 2:
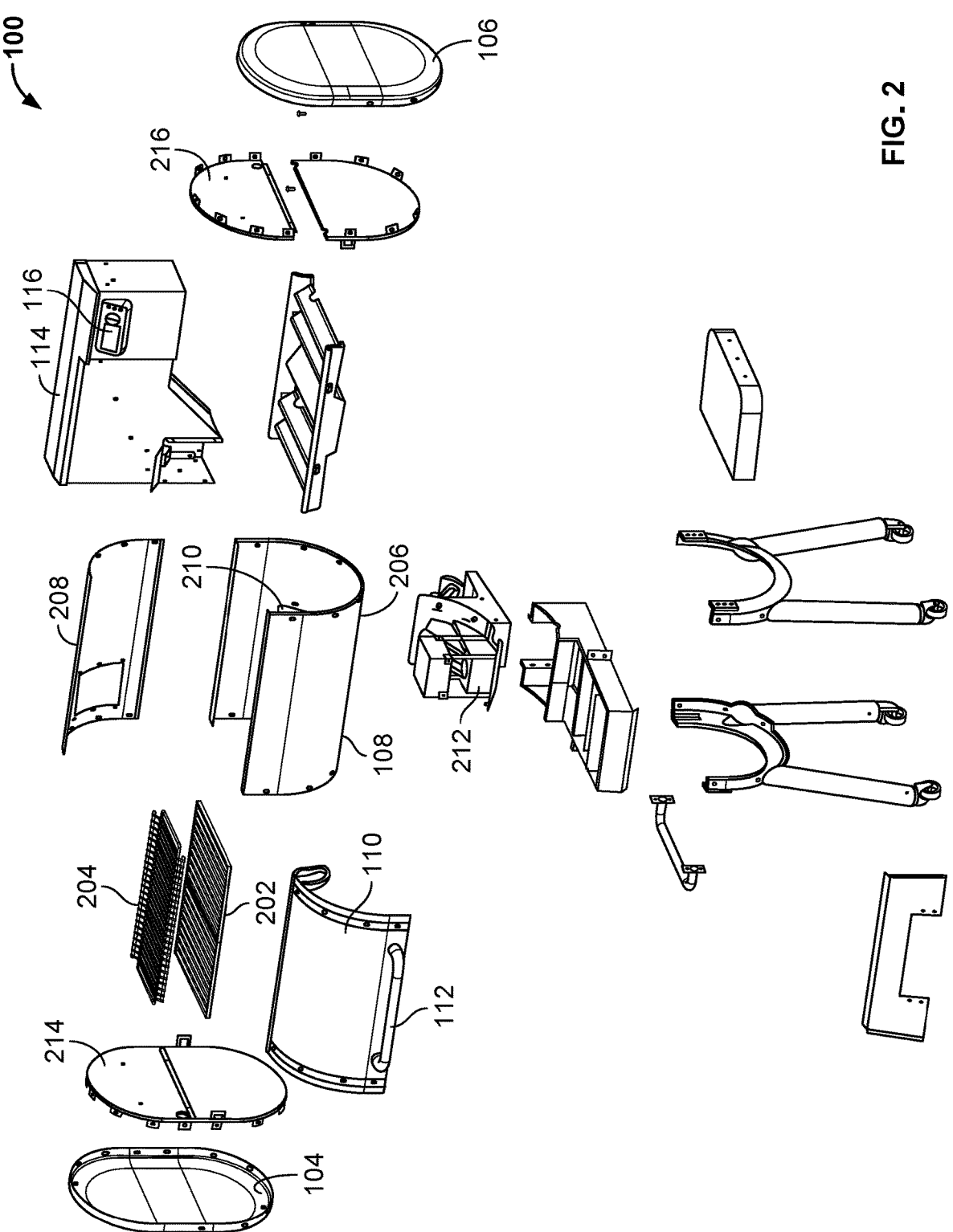
FIG. 2 is an exploded view of the pellet grill of FIG. 1.
Figure 3:
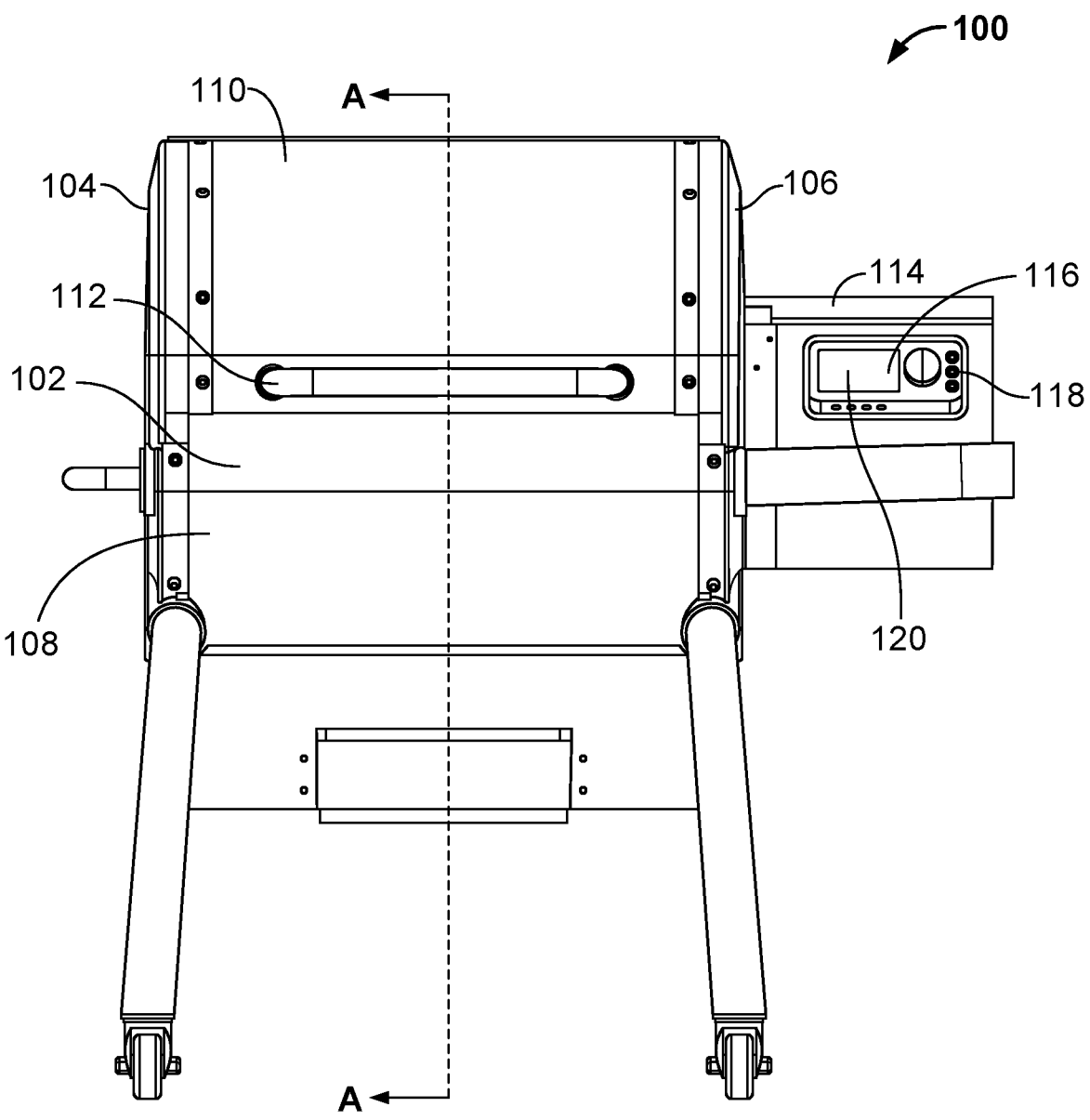
FIG. 3 is a front view of the pellet grill of FIGS. 1 and 2.
Figure 4:
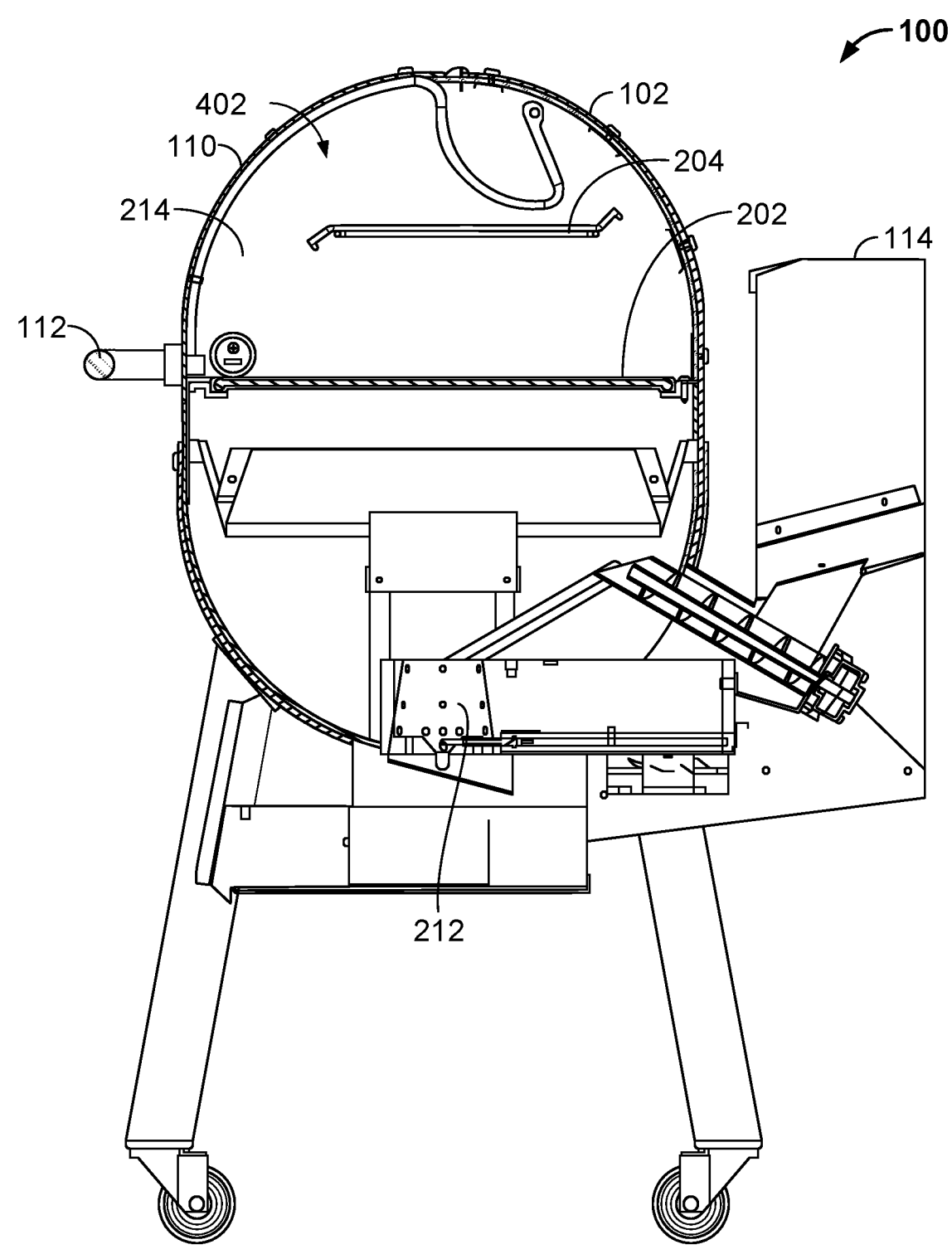
FIG. 4 is a cross-sectional view of the pellet grill of FIGS. 1-3 taken along section A-A of FIG. 3.

FIG. 1 is a perspective view of an example pellet grill 100 constructed in accordance with teachings of this disclosure. FIG. 2 is an exploded view of the pellet grill 100 of FIG. 1. FIG. 3 is a front view of the pellet grill 100 of FIGS. 1 and 2. FIG. 4 is a cross-sectional view of the pellet grill 100 of FIGS. 1-3 taken along section A-A of FIG. 3. The pellet grill 100 of FIGS. 1-4 includes an example main body 102. The main body 102 of the pellet grill 100 is formed and/or defined via an example first (e.g., left) end cap 104, an example second (e.g., right) end cap 106 located opposite the first end cap 104, and an example outer wall 108 that extends between the first and second end caps 104, 106. As shown in FIG. 4, the first end cap 104, the second end cap 106, the outer wall 108 and/or, more generally, the main body 102 of the pellet grill 100 define(s) an example cooking chamber 402 of the pellet grill 100 located within the main body 102. The cooking chamber 402 and/or, more generally, the main body 102 of the pellet grill 100 includes an example first cooking grate 202 and an example second cooking grate 204 that respectively support food items that are cooked, cooking, and/or to be cooked within the cooking chamber 402.

In the illustrated example of FIGS. 1-4, the outer wall 108 of the main body 102 is formed from an example first (e.g., lower) outer wall segment 206 and an example second (e.g., upper) outer wall segment 208 that is couplable to the first outer wall segment 206. In other examples, the first and second outer wall segments 206, 208 of the outer wall 108 of the main body 102 can be integrally formed as a single component. In the illustrated example of FIGS. 1-4, the first outer wall segment 206 and/or, more generally, the outer wall 108 of the main body 102 includes an example first opening 210 that is configured (e.g., sized, shaped and/or positioned) to receive an example engine 212 of the pellet grill 100. The outer wall 108 and/or, more generally, the main body 102 of the pellet grill also includes and/or defines an example second opening that is configured (e.g., sized, shaped and/or positioned) to be selectively covered or uncovered by an example lid 110 of the pellet grill 100. Placement of the lid 110 in an open position enables a user to access the cooking chamber 402, as may be required to load, unload, and/or otherwise access food items that are cooked, cooking, and/or to be cooked within the cooking chamber 402. Movement of the lid between a closed position (e.g., as shown in FIGS. 1, 2, and 4) and an open position can be facilitated via an example handle 112 that is coupled to the lid 110.

The pellet grill 100 of FIGS. 1-4 further includes an example hopper 114. The hopper 114 holds a volume of pellet fuel to be fed and/or supplied (e.g., via gravity) to the engine 212 of the pellet grill 100. In the illustrated example of FIGS. 1-4, the hopper 114 is mounted on and/or to the rear of the pellet grill 100 and is generally oriented toward the second end cap 106 of the main body 102. The hopper 114 extends laterally past the second end cap 106, thereby facilitating loading and/or filling of the hopper 114 from a front and/or side area of the pellet grill 100 proximate the side table 130. In other examples, the hopper 114 can be mounted on and/or to the rear of the pellet grill 100, but alternatively be oriented toward and extend laterally past the first end cap 104 of the main body 102. In still other examples, the hopper 114 can alternatively be mounted on and/or to the left side or the right side of the pellet grill 100.

The pellet grill 100 of FIGS. 1-4 further includes the engine 212. The engine 212 extends through the first opening 210 formed in the outer wall 108 of the main body 102. A frame of the engine is coupled to the outer wall 108 and/or, more generally, to the main body 102 to rigidly secure the engine 212 thereto. The engine 212 receives pellet fuel from the hopper 114 of the pellet grill 100. The engine 212 combusts the received pellet fuel to produce, generate, and/or output heat, which thereafter is distributed throughout the cooking chamber 402 of the pellet grill 100 to cook one or more food item(s) located therein. An example implementation of the engine 212 of the pellet grill 100 of FIGS. 1-4 is further described below in connection with FIGS. 5-10.

The pellet grill 100 of FIGS. 1-4 further includes an example user interface 116. The user interface 116 includes one or more example input device(s) 118 (e.g., buttons, switches, knobs, touchscreens, etc.) and/or one or more example output device(s) 120 (e.g., liquid crystal displays, light emitting diodes, speakers, etc.) that enable a user of the pellet grill 100 to interact with a control system of the pellet grill 100 (e.g., the control system 1100 of FIG. 11 discussed below). In the illustrated example of FIGS. 1-4, the user interface 116 is mounted on and/or to the front of the hopper 114. In other examples, the user interface 116 can be mounted on and/or to a different surface of the hopper 114. In still other examples, the user interface 138 can be mounted on and/or to a different component of the pellet grill 100, such as the side table 130 of the pellet grill 100. An example implementation of the user interface 116 of the pellet grill 100 of FIGS. 1-4 is further described below in connection with FIG. 11.

Figure 5:
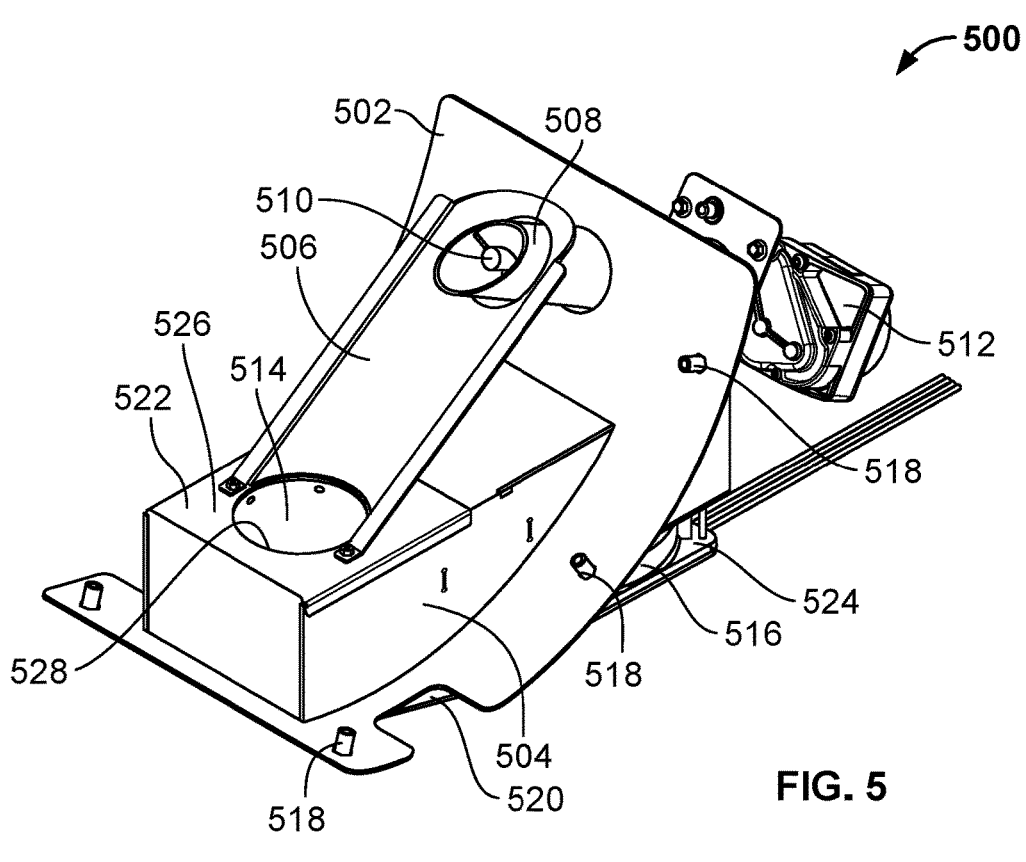
FIG. 5 is a first perspective view of an example engine of a pellet grill.
Figure 6:
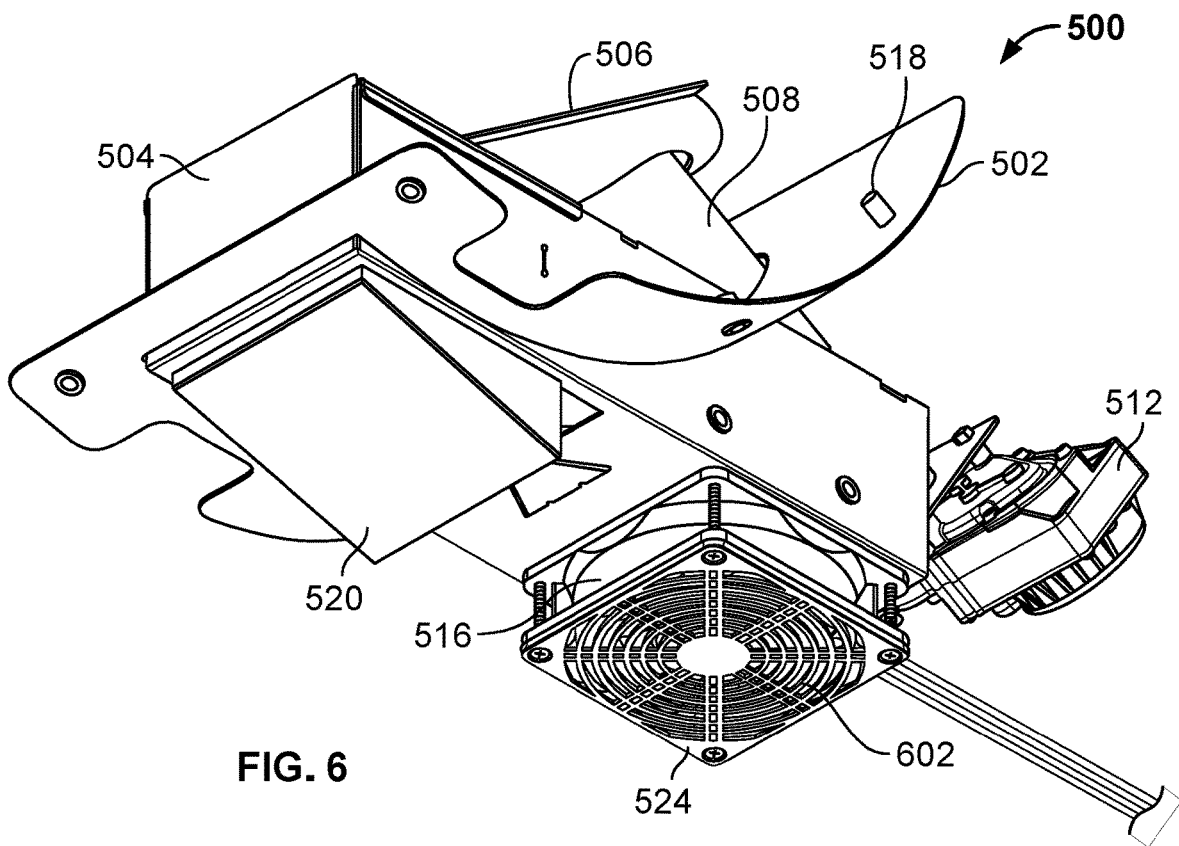
FIG. 6 is a second perspective view of the engine of FIG. 5.
Figure 7A:
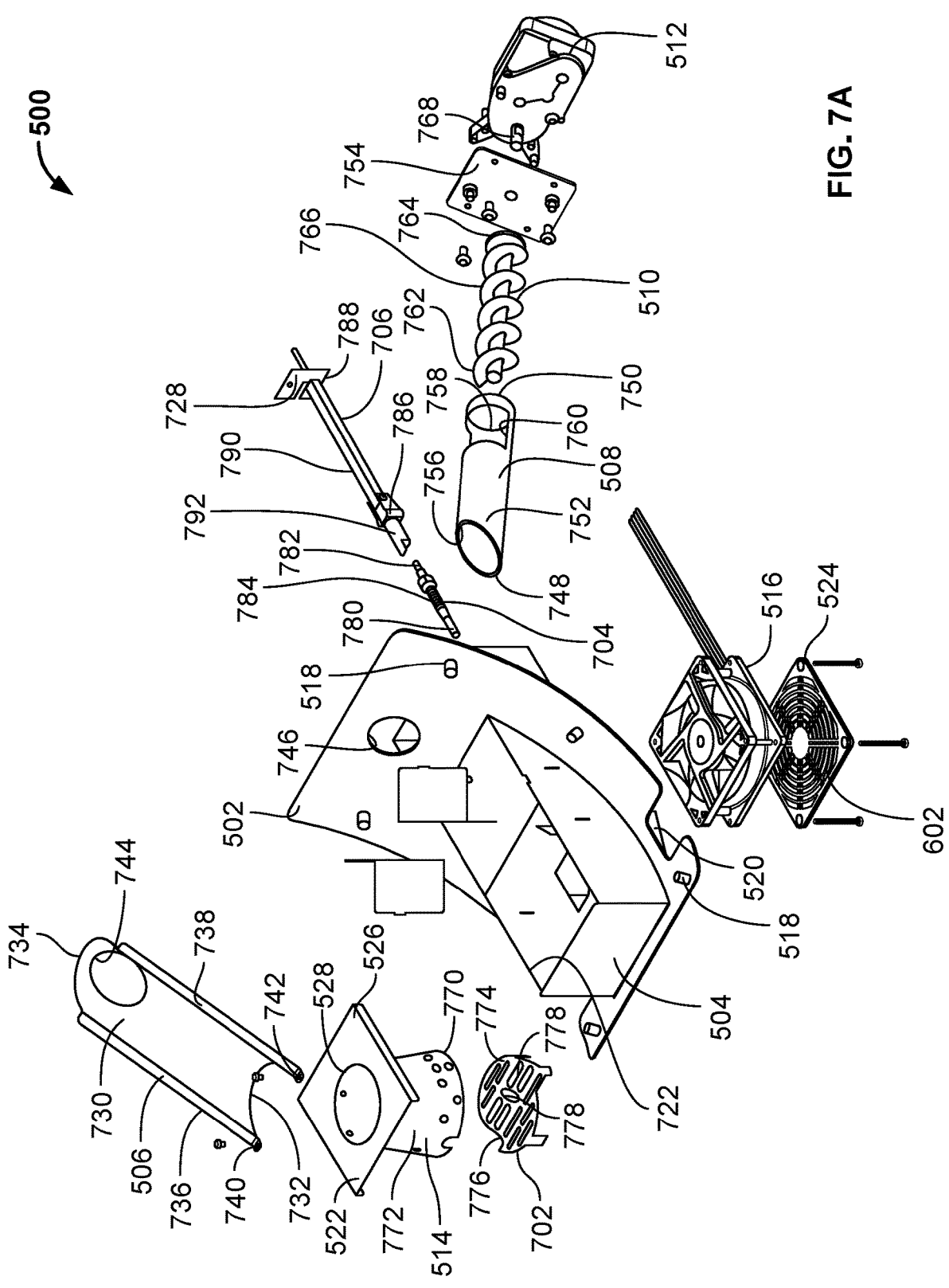
FIGS. 7A and 7B are exploded views of the engine of FIGS. 5 and 6.
Figure 7B:
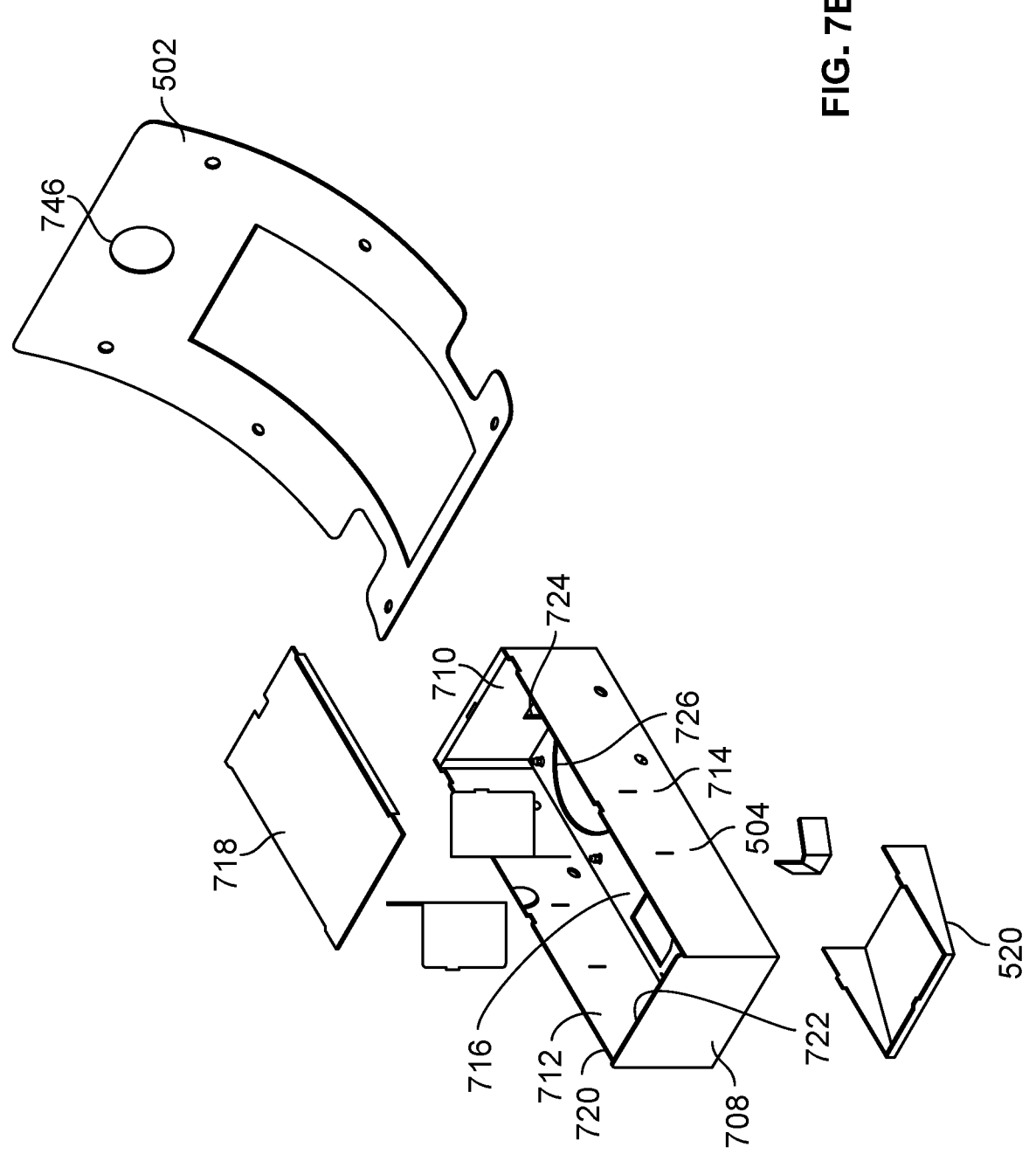
Figure 8:
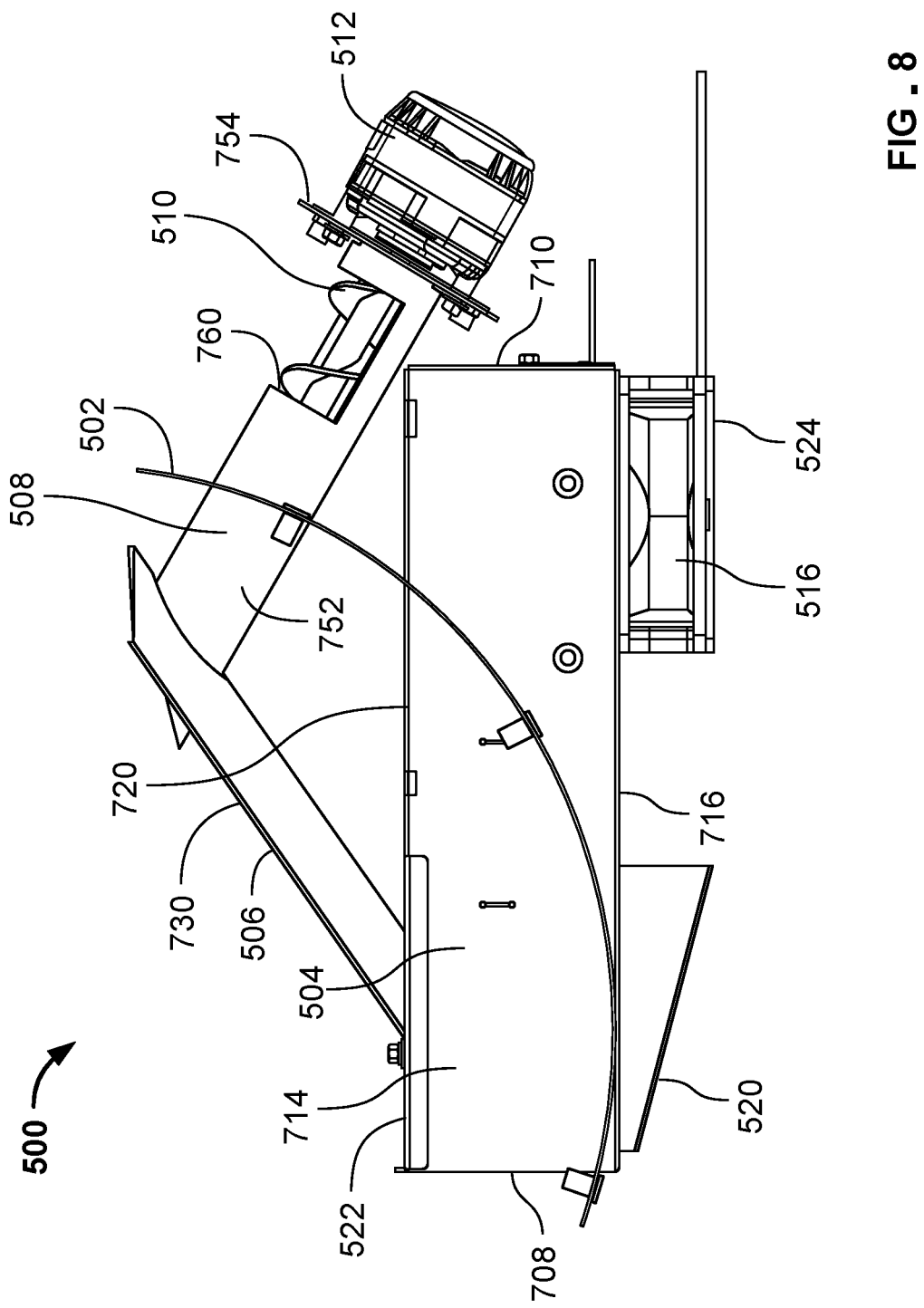
FIG. 8 is a side view of the engine of FIGS. 5-7.
Figure 9:
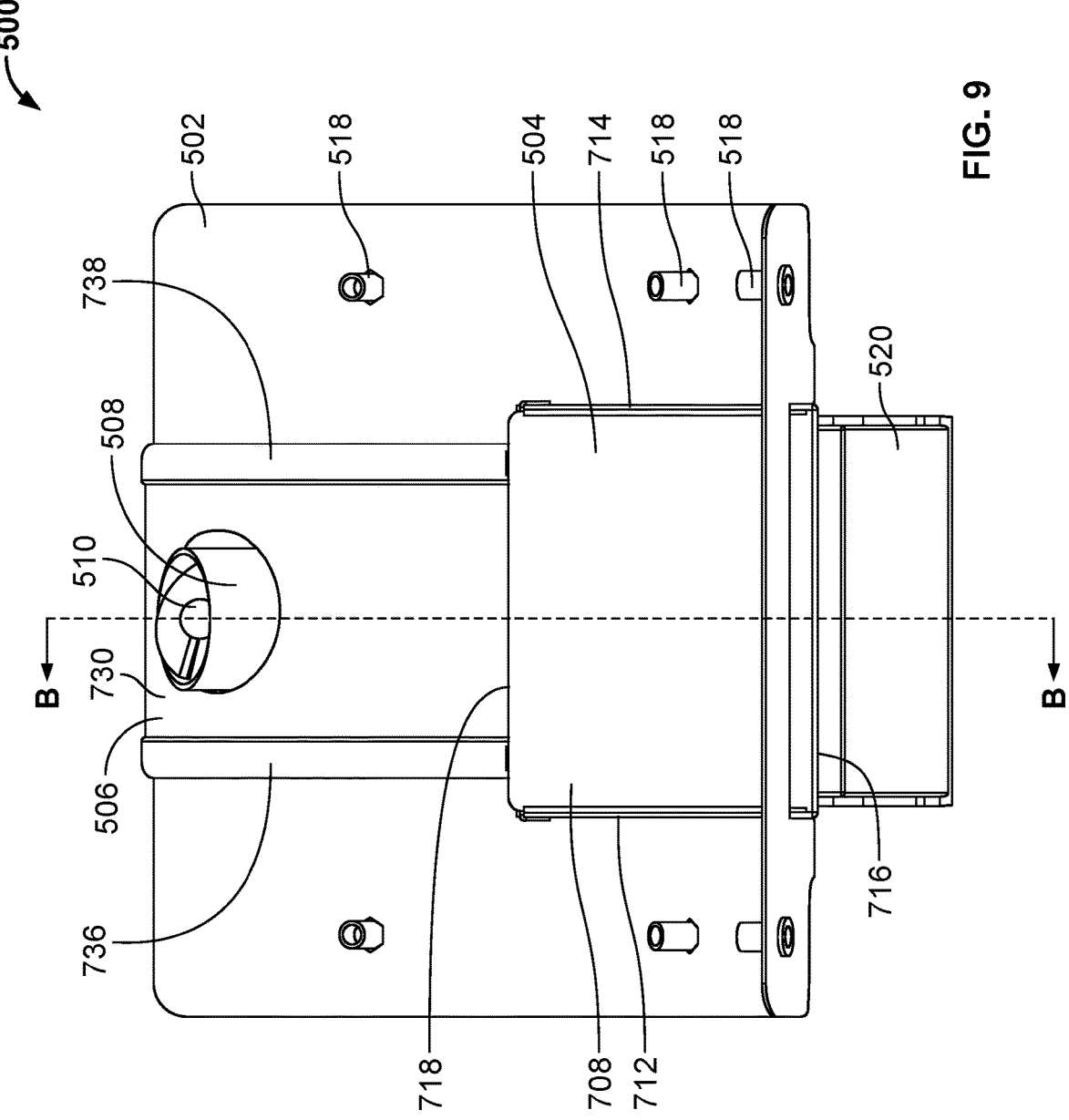
FIG. 9 is a front view of the engine of FIGS. 5-8.
Figure 10:
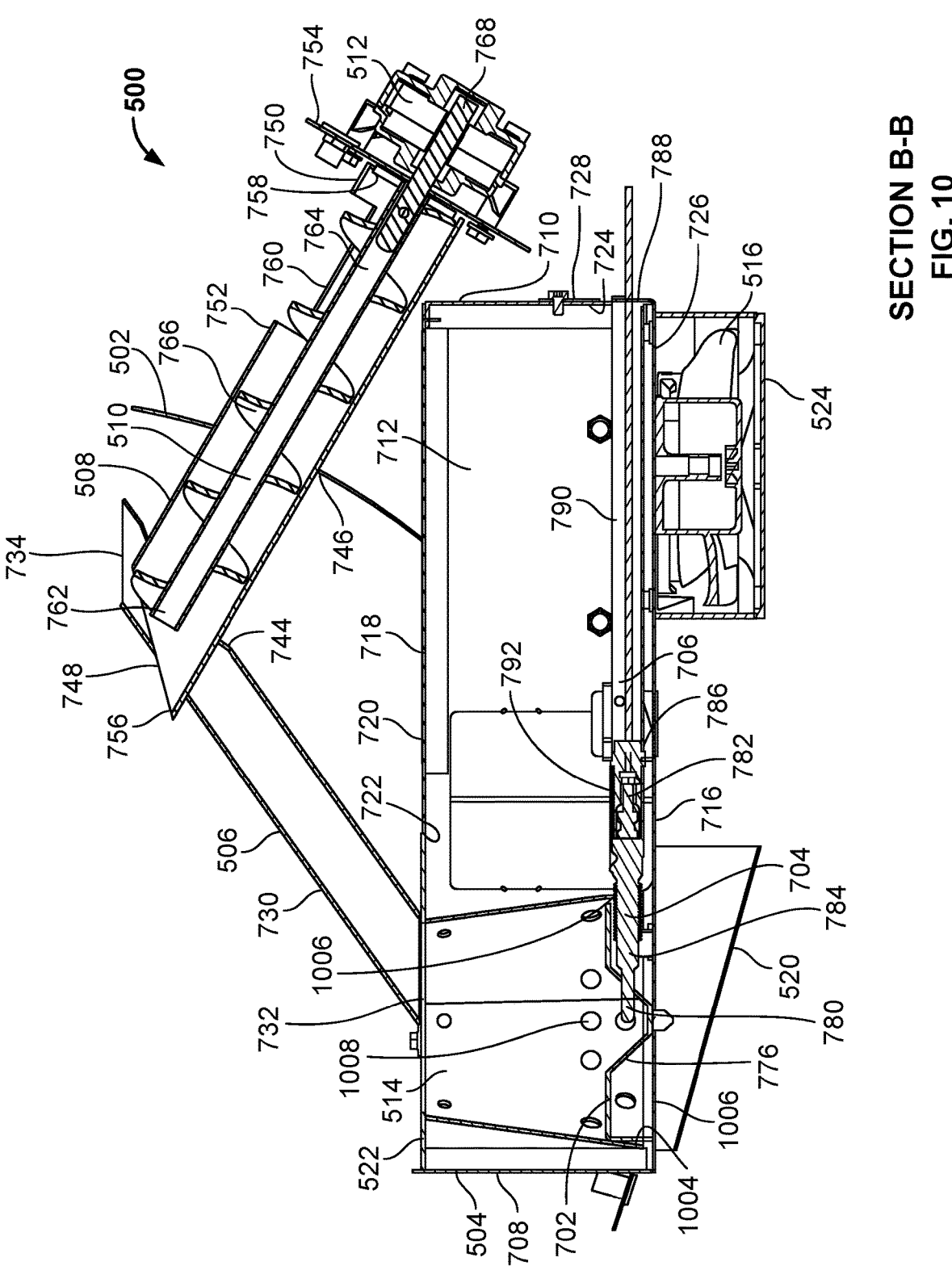
FIG. 10 is a cross-sectional view of the engine of FIGS. 5-9 taken along section B-B of FIG. 9.

FIG. 5 is a first perspective view of an example engine 500 of a pellet grill. FIG. 6 is a second perspective view of the engine 500 of FIG. 5. FIGS. 7A and 7B are exploded views of the engine 500 of FIGS. 5 and 6. FIG. 8 is a side view of the engine 500 of FIGS. 5-7. FIG. 9 is a front view of the engine 500 of FIGS. 5-8. FIG. 10 is a cross-sectional view of the engine 500 of FIGS. 5-9 taken along section B-B of FIG. 9. The engine 500 of FIGS. 5-10 can be implemented as the engine 212 of the pellet grill 100 of FIGS. 1-4 described above.

The engine 500 of FIGS. 5-10 includes an example frame 502, an example housing 504, an example fuel slide 506, an example auger duct 508, an example auger 510, an example auger motor 512, an example burn pot 514, an example fan 516, an example fuel grate 702, an example ignitor 704, and an example ignitor carrier 706. In the illustrated example of FIGS. 5-10, the frame 502 of the engine 500 has a curved shape that complements and/or matches the curved shape of the outer wall 108 of the main body 102 of the pellet grill 100 proximate the first opening 210 of the outer wall 108. The frame 502 includes a plurality of example nuts 518 that are configured (e.g., sized, shaped and/or arranged) to align with corresponding ones of the through-holes formed in the outer wall 108 of the main body 102 of the pellet grill 100 to facilitate coupling (e.g., via fasteners) the frame 502 to the outer wall 108 of the main body 102 of the pellet grill 100 such that portions of the engine 500 extend through the first opening 210 of the outer wall 108 of the main body 102. For example, when the frame 502 of FIGS. 5-10 is coupled to the outer wall 108 of the main body 102 of the pellet grill 100, portions of the housing 504, the fuel slide 506, the auger duct 508, the auger 510, the burn pot 514, the fuel grate 702, the ignitor 704, and the ignitor carrier 706 extend inwardly through the first opening 210 of the outer wall 108 and are located within the main body 102 (e.g., within the cooking chamber 402) of the pellet grill 100.

The housing 504 of the engine 500 of FIGS. 5-10 extends through and is partially supported by the frame 502 of the engine 500. In the illustrated example of FIGS. 5-10, the housing 504 is a rectangular box-shaped structure that includes and/or is defined by an example front wall 708, an example rear wall 710 located opposite the front wall 708, an example first (e.g., left) sidewall 712 extending between the front wall 708 and the rear wall 710, an example second (e.g., right) sidewall 714 extending between the front wall 708 and the rear wall 710 and located opposite the first sidewall 712, and an example bottom wall 716 extending between the front wall 708 and the rear wall 710 and further extending between the first sidewall 712 and the second sidewall 714. An example cover plate 718 defines an example top surface 720 of the housing 504.

The housing 504 further includes an example first opening 722, an example second opening 724, an example third opening 1002, and an example fourth opening 726. The first opening 722 of the housing 504 is located at the top surface 720 of the housing 504 forward of the cover plate 718. The second opening 724 of the housing 504 is located at and/or formed in the rear wall 710 of the housing 504 proximate the bottom wall 716 of the housing 504. The third opening 1002 of the housing 504 is located at and/or formed in the bottom wall 716 of the housing 504 proximate the front wall 708 of the housing 504. The fourth opening 726 of the housing 504 is located at and/or formed in the bottom wall 716 of the housing 504 proximate the rear wall 710 of the housing 504.

As shown in FIG. 10, the housing 504 of the engine 500 houses, contains and/or carries the burn pot 514, the fuel grate 702, the ignitor 704, and the ignitor carrier 706 of the engine 500. The burn pot 514 (which includes the fuel grate 702) is received within the housing 504 via the first opening 722 of the housing 504, and is positioned and/or located over and/or in vertical alignment with the third opening 1002 of the housing 504. The vertical alignment of the burn pot 514 and the fuel grate 702 over the third opening 1002 of the housing 504 advantageously enables ash (e.g., as may be produced and/or generated during combustion and/or burning of pellet fuel contained within the burn pot 514) to pass and/or fall through the fuel grate 702 and through the third opening 1002 of the housing 504 onto an example the ash slide 520 of the engine 500. The ash slide 520 is configured (e.g., sized, shaped and/or arranged) to guide ash downwardly (e.g., away from the burn pot 514), and to prevent a cyclone flow of ash from migrating upwardly toward the burn pot 514. When the burn pot 514 has been placed within the housing 504, an example upper plate 522 of the burn pot 514 covers and/or closes a portion of the first opening 722 of the housing 504 forward of the cover plate 718. The fuel slide 506 of the engine 500 is mounted and/or coupled to the upper plate 522 of the burn pot 514, as further described below. As further shown in FIG. 10, the ignitor 704 and the ignitor carrier 706 of the engine 500 are slidingly received within the housing 504 via the second opening 724 of the housing 504. When the ignitor 704 and the ignitor carrier 706 have been placed within the housing 504, an example rear tab 728 of the ignitor carrier 706 covers and/or closes the second opening 724 of the housing 504.

The fan 516 of the engine 500 is mounted and/or coupled to the housing 504 at the bottom wall 716 of the housing 504 via an example fan retainer 524, and is positioned and/or located below and/or in vertical alignment with the fourth opening 726 of the housing 504. The vertical alignment of the fan 516 below the fourth opening 726 of the housing 504 enables an airflow produced, generated, and/or output by the fan 516 to pass through the fourth opening 726 into the housing 504. Once the airflow has passed from the fan 516 into the housing 504, the airflow is subsequently directed toward and/or into the burn pot 514.

In the illustrated example of FIGS. 5-10, the fuel slide 506 includes an example panel 730 having an example front end 732, an example rear end 734 located opposite the front end 743, a first example outwardly-extending flange 736 extending between the front end 732 and the rear end 734, and a second example outwardly-extending flange 738 extending between the front end 732 and the rear end 734 and located opposite the first outwardly-extending flange 736. The panel 730 further includes a first example mounting tab 740 located proximate the front end 732 of the panel 730 and extending forwardly from the first outwardly-extending flange 736, a second example mounting tab 742 located proximate the front end 732 of the panel 730 and extending forwardly from the second outwardly-extending flange 738, and an example opening 744 located proximate the rear end 734 of the panel 730.

In the illustrated example of FIGS. 5-10, each of the first and second mounting tabs 740, 742 of the panel 730 is configured (e.g., sized, shaped and/or arranged) to align and/or mate with the through-holes formed in the upper plate 522 of the burn pot 514 to facilitate mounting and/or coupling the fuel slide 506 of the engine 500 to the burn pot 514 of the engine 500. The opening 744 of the panel 730 is configured (e.g., sized, shaped and/or arranged) to slidingly receive the auger duct 508 to facilitate mounting and/or coupling the fuel slide 506 of the engine 500 to the auger duct 508 of the engine 500. The panel 730 of the fuel slide 506 is oriented and/or angled at a rear-to-front decline (e.g., the rear end 734 of the panel 730 is higher than the front end 732 of the panel 730). The panel 730 is configured to receive pellet fuel exiting the auger duct 508 of the engine 500, and to feed and/or direct the received pellet fuel downwardly and/or forwardly from the rear (e.g., upper) end 734 of the panel 730 to the front (e.g., lower) end 732 of the panel 730, and subsequently into the burn pot 514 of the engine 500.

The auger duct 508 of the engine 500 of FIGS. 5-10 extends through and is partially supported by an example opening 746 formed in the frame 502 of the engine 500. The auger duct 508 also extends through and is partially supported by the opening 744 formed proximate the rear (e.g., upper) end 734 of the panel 730 of the fuel slide 506. In the illustrated example of FIGS. 5-10, the auger duct 508 is a cylindrical shaped structure that is configured (e.g., sized, shaped and/or arranged) to house and/or contain the auger 510 of the engine 500, along with pellet fuel to be fed and/or supplied by the auger 510 from a feed duct of the hopper 114 of the pellet grill 100 to the panel 730 of the fuel slide 506 of the engine 500. The auger duct 508 of FIGS. 5-10 includes and/or is defined by an example front end 748, an example rear end 750 located opposite the front end 748, and an example sidewall 752 extending between the front end 748 and the rear end 750. In the illustrated example of FIGS. 5-10, the auger duct 508 is oriented and/or angled at a rear-to-front incline (e.g., the rear end 750 of the auger duct 508 is lower than the front end 748 of the auger duct 508). The auger duct 508 is coupled to an example duct base 754. The duct base 754 is configured (e.g., sized, shaped and/or arranged) to facilitate coupling the auger duct 508 to the auger 510 and/or to the auger motor 512 of the engine 500.

The auger duct 508 of FIGS. 5-10 further includes an example first opening 756 formed in the front end 748 of the auger duct 508, an example second opening 758 formed in the rear end 750 of the auger duct 508, and an example third opening 760 formed in an upper portion of the sidewall 752 of the auger duct 508. The first and second openings 756, 758 of the auger duct 508 are respectively configured (e.g., sized, shaped and/or arranged) to enable the auger duct 508 to be slidingly positioned around and/or over (e.g., over the length of) the auger 510 such that the auger 510 is housed and/or contained within the auger duct 508. The third opening 760 of the auger duct 508 is configured (e.g., sized, shaped and/or arranged) to receive pellet fuel from a feed duct of the hopper 114 of the pellet grill 100.

The auger 510 of the engine 500 of FIGS. 5-10 extends through the auger duct 508 of the engine 500. The auger 510 is configured (e.g., sized, shaped and/or arranged) to move pellet fuel received within the auger duct 508 either towards (e.g., during a cooking operation) or away from (e.g., in response to a jam of the auger 510, and/or during an end-of-cook purge of the pellet fuel) the front end 748 of the auger duct 508 and/or the panel 730 of the fuel slide 506 of the engine 500. In the illustrated example of FIGS. 5-10, the auger 510 includes an example front end 762 oriented toward the front end 748 of the auger duct 508, an example rear end 764 located opposite the front end 762 of the auger 510 and oriented toward the rear end 750 of the auger duct 508, and an example spiral shaped coil and/or flighting 766 that extends between the front end 762 and the rear end 764 of the auger 510. The flighting 766 of the auger 510 of FIGS. 5-10 is a non-variable pitch (e.g., a constant pitch) flighting. In other examples, the flighting 766 of the auger 510 can be a variable pitch flighting having an increasing rear-to-front pitch (e.g., the flighting spacing increases moving from the rear end 764 of the auger 510 to the front end 762 of the auger 510). Movement of the auger 510 (e.g., the direction of rotation, rate of rotation, and/or duty cycle of the auger 510) can be controlled via the auger motor 512 of the engine 500.

The auger motor 512 of the engine 500 of FIGS. 5-10 is coupled to the auger 510 and to the duct base 754. The auger motor 512 includes an example shaft 768 that operatively couples the auger motor 512 to the flighting 766 of the auger 510 to provide for motor-driven rotation thereof. The auger motor 512 controls the movement (e.g., the direction of rotation, rate of rotation, and/or duty cycle) of the auger 510. In the illustrated example of FIGS. 5-10, the auger motor 512 is a controllable, DC-powered, variable-speed electric motor that operates in response to data, commands and/or signals received from a control system (e.g., the control system 1100 of FIG. 11 described below) of the pellet grill 100.

In some examples, the auger motor 512 of FIGS. 5-10 causes the auger 510 to rotate in a first (e.g., clockwise) direction to move pellet fuel contained in the auger duct 508 away from the rear end 750 of the auger duct 508 and/or toward the front end 748 of the auger duct 508, and/or toward the panel 730 of the fuel slide 506 of the engine 500. The auger motor 512 of FIGS. 5-10 can also cause the auger 510 to rotate in a second (e.g., counterclockwise) direction to move pellet fuel contained in the auger duct 508 away from the front end 748 of the auger duct 508 and/or toward the rear end 750 of the auger duct 508, and/or away from the panel 730 of the fuel slide 506 of the engine 500. Thus, the auger 510 of the engine 500 is a reversible auger, the direction of rotation of which is controlled via the auger motor 512 of the engine 500.

The burn pot 514 of FIGS. 5-10 is configured to contain pellet fuel that is to be combusted, is being combusted, and/or is burning within the burn pot 5146. The burn pot 2216 is further configured to direct heat produced, generated, and/or output as a byproduct of the pellet fuel combustion and/or burning upwardly, and to direct ash produced and/or generated as a byproduct of the pellet fuel combustion and/or burning downwardly. In the illustrated example of FIGS. 5-10, the burn pot 514 includes an example upper end 526 defined by the upper plate 522 of the burn pot 514, an example lower end 770 located opposite the upper end 526 of the burn pot 514, and an example sidewall 772 extending between the upper end 526 and the lower end 770 of the burn pot 514. The burn pot 514 further includes an example first opening 528 formed along and/or at the upper end 526 of the burn pot 514. The first opening 528 of the burn pot 514 is configured (e.g., sized, shaped and/or arranged) to receive pellet fuel from the panel 730 of the fuel slide 506 of the engine 500, and to emit and/or output heat produced and/or generated as a byproduct of the pellet fuel combustion and/or burning upwardly. The burn pot 514 of FIGS. 5-10 further includes an example second opening 1004 formed along and/or at the lower end 770 of the burn pot 514. The second opening 1004 of the burn pot 514 is configured (e.g., sized, shaped and/or arranged) to release ash produced and/or generated as a byproduct of the pellet fuel combustion and/or burning downwardly. The fuel grate 702 is positioned and/or located within the burn pot 514 between the first opening 528 and the second opening 1004 of the burn pot 514.

The burn pot 514 of FIGS. 5-10 further includes an example third opening 1006 and example through-holes 1008 respectively formed in the sidewall 772 of the burn pot 514. The third opening 1006 of the burn pot 514 is configured (e.g., sized, shaped and/or arranged) to slidingly receive the ignitor 704 of the engine 500 such that a tip of the ignitor 704 is positioned and/or located within the burn pot 514 proximate the lower end 770 of the burn pot 514. The through-holes 1008 of the burn pot 514 are configured (e.g., sized, shaped and/or arranged) about the sidewall 772 of the burn pot 514 to enable an airflow produced, generated, and/or output by the fan 516 of the engine 500 to be received within the burn pot 514. Movement of the airflow into the burn pot 514 via the through-holes 1008 assists in controlling the combustion and/or burning of the pellet fuel within the burn pot 514, and/or assists in controlling the movement of heat produced, generated, and/or output as a byproduct of the pellet fuel combustion and/or burning from the burn pot 514 throughout the cooking chamber 402 of the pellet grill 100.

The fuel grate 702 of the burn pot 514 of FIGS. 5-10 is configured to support and/or maintain pellet fuel that is to be combusted, is being combusting, and/or is burning within the burn pot 514. The fuel grate 702 is further configured to release ash produced and/or generated as a byproduct of the pellet fuel combustion and/or burning downwardly toward the lower end 770 and/or the second opening 1004 of the burn pot 514, and/or toward the ash slide 520 of the pellet grill 100. The fuel grate 702 includes an example upper surface 774, an example trough 776 extending downwardly from and/or below the upper surface 774, and example openings 778 (e.g., slots and/or holes) formed along the upper surface 774 and the trough 776 of the fuel grate 702.

The upper surface 774 of the fuel grate 702 defines a circular and/or disc-like shape of the fuel grate 702 that is configured (e.g., sized and/or shaped) to fill the cross-sectional area defined by the sidewall 772 of the burn pot 514 at the location along the sidewall 772 at which the fuel grate 702 is to be positioned and/or located. The fuel grate 702 is position and/or located within the burn pot 514 between the first opening 528 and the second opening 1004 of the burn pot 514. The openings 778 formed in the upper surface 774 and the trough 776 of the fuel grate 702 can be configured (e.g., sized, shaped and/or arranged) in any manner that facilitates the passage of ash (e.g., ash produce and/or generated as a byproduct of pellet fuel combustion and/or burning) downwardly through the openings 778 to a location below the fuel grate 702.

The trough 776 of the fuel grate 702 is configured to funnel, direct and/or collect pellet fuel that has been deposited into the burn pot 514 toward and/or within a centralized position and/or location of the fuel grate 702. As shown in FIGS. 7 and 10, the trough 776 of the fuel grate 702 extends across the fuel grate 702 and has an orientation that is perpendicular to the orientation of a shaft of the ignitor 704 of the engine 500. In other examples, the trough 776 of the fuel grate 702 can alternatively have an orientation that differs from the orientation of the trough 776 shown in FIGS. 7 and 10. For example, the trough 776 of the fuel grate 702 can alternatively have an orientation that is parallel to the orientation of the shaft of the ignitor 704 of the engine 500.

In some examples, the trough 776 and/or, more generally, the fuel grate 702 of the burn pot 514 is oriented such that a portion (e.g., a tip) of the ignitor 704 of the engine 500 is positioned and/or located within the trough 776. In such examples, the trough 776 of the fuel grate 702 advantageously directs and/or collects pellet fuel toward and/or within a centralized position and/or location of the fuel grate 702, thereby causing the collected pellet fuel to be placed adjacent to and/or in contact with the ignitor 704. Centralizing and/or localizing pellet fuel within the trough 776 as described above is advantageous for startup and/or initiating combustion of the pellet fuel. Centralizing and/or localizing pellet fuel within the trough 776 as described above is also advantageous for low-temperature cooking operations (e.g., smoking) in which the burn pot 514 of the engine 500 will contain a relatively low volume of pellet fuel.

As shown in FIGS. 7 and 10, the trough 776 of the fuel grate 702 is generally v-shaped. In other examples, the trough 776 can have an alternative shape that differs from the shape shown in FIGS. 7 and 10. For example, the trough 776 of the fuel grate 702 can alternatively have a rectangular shape or a curved (e.g., concave upward) shape. The trough 776 can be configured to have any shape that funnels, directs and/or collects pellet fuel which has been deposited into the burn pot 514 toward and/or within a centralized position and/or location of the fuel grate 702 of the burn pot 514.

The ignitor 704 of the engine 500 of FIGS. 5-10 includes an example front end 780, an example rear end 782 located opposite the front end 780 of the ignitor 704, and an example shaft 784 extending from the front end 780 toward the rear end 782 of the ignitor 704. In the illustrated example of FIGS. 5-10, the front end 780 of the ignitor 704 extends though one of the openings 778 formed in the trough 776 of the fuel grate 702 such that the front end 780 of the ignitor 704 is positioned and/or located within the trough 776 of the fuel grate 702 and/or, more generally, within the burn pot 514 of the engine 500. The rear end 782 of the ignitor 704 is positioned and/or located within, and/or is supported by, the ignitor carrier 706. A middle portion of the shaft 784 of the ignitor 704 extends thought the third opening 1006 of the sidewall 772 of the burn pot 514. A rearward portion of the shaft 784 is supported by and/or removably coupled to the ignitor carrier 706. The ignitor 704 can be activated to produce, generate, and/or output heat that causes pellet fuel positioned and/or located within the burn pot 514 (e.g., positioned and/or located on the fuel grate 702 of the burn pot 514) to ignite and/or commence combustion. In the illustrated example of FIGS. 5-10, the ignitor 704 is a controllable, DC-powered glow plug that operates in response to data, commands and/or signals received from a control system (e.g., the control system 1100 of FIG. 11 described below) of the pellet grill 100.

The ignitor carrier 706 of the engine 500 of FIGS. 5-10 includes an example front end 786, an example rear end 788 located opposite the front end 786 of the ignitor carrier 706, and example arms 790 extending between the front end 786 and the rear end 788 of the ignitor carrier 706. The front end 786 of the ignitor carrier 706 includes an example connection socket 792 that is configured (e.g., sized, shaped and/or arranged) to receive the rear end 782 and/or the rearward portion of the shaft 784 of the ignitor 704. The ignitor 704 is supported and/or carried by the ignitor carrier 706, and is removably couplable to the ignitor carrier 706 via the connection socket 792 located at the front end 786 of the ignitor carrier 706. The rear end 788 of the ignitor carrier 706 forms the rear tab 728 of the ignitor carrier 706 which, as described above, is accessible from the rear side of the housing 504 of the engine 500 of FIGS. 5-10.

The ignitor carrier 706 and the ignitor 704 of FIGS. 5-10 can be removed (e.g., to facilitate replacement of the ignitor 704) from the housing 504 of the engine 500 and/or, more generally, from the pellet grill 100 via the rear tab 728 of the ignitor carrier 706. For example, pulling the ignitor carrier 706 rearwardly via the rear tab 728 of the ignitor carrier 706 causes the ignitor 704 to be removed from the trough of the fuel grate 702 (e.g., through one of the openings 778 formed in the trough 776), removed from the burn pot 514 of the engine 500 (e.g., through the third opening 1006 formed in the sidewall 772 of the burn pot 514), and removed from the housing 504 of the engine 500 (e.g., through the second opening 724 formed in the rear wall 710 of the housing 504). Once the ignitor carrier 706 and the ignitor 704 have been removed from the housing 504 and/or the pellet grill 100, the ignitor 704 can in turn be removed from the ignitor carrier 706 (e.g., by pulling the ignitor 704 out of the connection socket 792 of the ignitor carrier 706) and replaced with another (e.g., a new and/or replacement) ignitor 704. The ignitor carrier 706 and the replacement ignitor 704 can thereafter be reinserted and/or slid back into the housing 504 and/or the pellet grill 100.

The fan 516 of the engine 500 of FIGS. 5-10 is coupled to the bottom wall 716 of the housing 504 of the engine 500 via the fan retainer 524. The fan retainer 524 includes an example grate 602 that is configured (e.g., sized and/or shaped) to allow air to pass into the fan 516 while also advantageously preventing solid foreign objects from inadvertently being drawn into the fan 516. In the illustrated example of FIGS. 5-10, the fan 516 and the fan retainer 524 are located and/or positioned in vertical alignment with the fourth opening 726 of the housing 504. The fan 516 produces, generates, outputs, and/or controls an airflow to be directed through the housing 504 from the fan 516 to the burn pot 514. The airflow produced, generated, and/or output by the fan 516 can subsequently pass from the burn pot 514 into the cooking chamber 402 of the pellet grill 100 to provide a controlled circulation of hot air within the cooking chamber 402. In the illustrated example of FIGS. 5-10, the fan 516 is a controllable, DC-powered, variable-speed electric motor fan that operates in response to data, commands and/or signals received from a control system (e.g., the control system 1100 of FIG. 11 described below) of the pellet grill 100.

Figure 11:
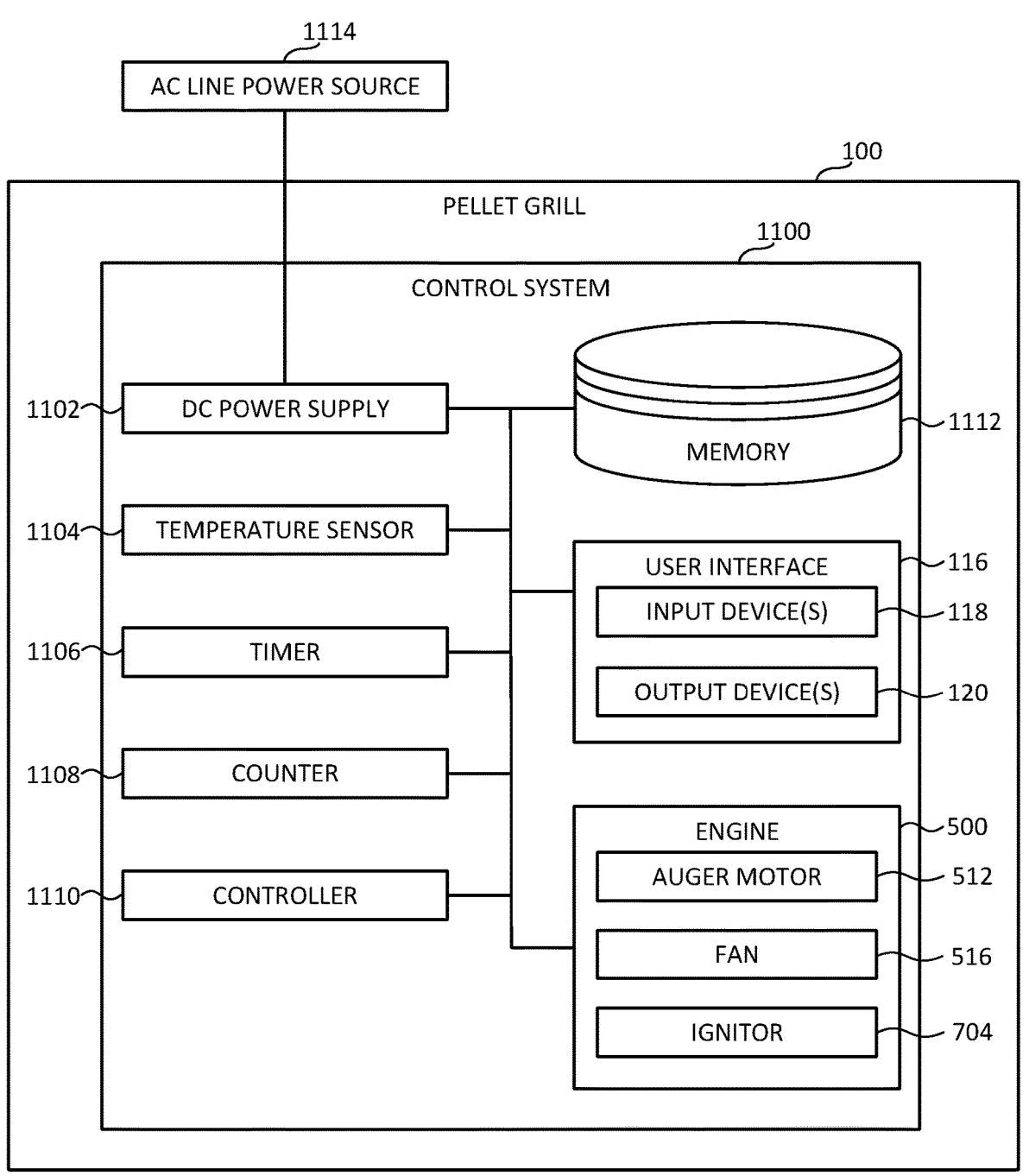
FIG. 11 is a block diagram of an example control system to be implemented in connection with the pellet grill of FIGS. 1-4.

FIG. 11 is a block diagram of an example control system 1100 to be implemented in connection with the pellet grill 100 of FIGS. 1-4. The control system 1100 of FIG. 11 includes the user interface 116 (e.g., including the input device(s) 118 and the output device(s) 120) and the engine 500 (e.g., including the auger motor 512, the fan 516, and the ignitor 704) of FIGS. 1-10 described above. The control system 1100 of FIG. 11 further includes an example DC power supply 1102, an example temperature sensor 1104, an example timer 1106, an example counter 1108, an example controller 1110, and an example memory 1112.

The DC power supply 1102 of FIG. 11 receives AC power from an example AC line power source 1118 (e.g., a wall outlet) to which the DC power supply 1102 and/or, more generally, the pellet grill 100 is electrically connected. The DC power supply 1102 converts AC power received from the AC line power source 1114 into DC power that can thereafter be supplied to the user interface 116, the auger motor 512, the fan 516, the ignitor 704, the temperature sensor 1104, the timer 1106, the counter 1108, the controller 1110, and/or the memory 1112 of the pellet grill 100. In some examples, the distribution of DC power from the DC power supply 1102 to any of the aforementioned components of the control system 1100 can be controlled and/or managed by the controller 1110.

The temperature sensor 1104 of FIG. 11 senses, measures and/or detects the temperature of the cooking chamber 402 of the pellet grill 100. In some examples, the temperature sensor 1104 can be implemented by and/or as a thermocouple positioned in and/or extending into the cooking chamber 402 of the pellet grill 100. Data and/or signals sensed, measured and/or detected by the temperature sensor 1104 of FIG. 11 may be of any quantity, type, form and/or format, and may be stored in a computer-readable storage medium such as the memory 1112 of FIG. 11.

The timer 1106 of FIG. 11 is configured to measure and/or maintain elapsed time. In some examples, one or more operation(s) of the timer 1106 can be controlled and/or managed by the controller 1110. For example, the controller 1110 may command and/or instruct the timer 1106 to commence, stop, and/or reset the elapsed time being measured and/or maintained by the timer 1106. Based on the elapsed time measured and/or maintained by the timer 1106, the controller 1110 can detect whether the elapsed time exceeds a threshold time period (e.g., a threshold duration). In some examples, the threshold time period may be associated with an automated protocol, process, sequence, and/or method implemented by the control system 1100 of FIG. 11, including without limitation the various protocols, processes, sequences, and/or methods described below in connection with FIGS. 12-16.

The counter 1108 of FIG. 11 is configured to maintain a count. In some examples, one or more operation(s) of the counter 1108 can be controlled and/or managed by the controller 1110. For example, the controller 1110 may command and/or instruct the counter 1108 to increment, decrement, and/or reset an activation count maintained by the counter 1108, whereby the activation count corresponds to a number of activations of the ignitor 704. Based on the activation count maintained by the counter 1108, the controller 1110 can detect whether the ignitor 704 has been activated by more than a threshold activation count. In some examples, the threshold activation count may be associated with a predetermined time period. In other examples, the threshold activation count may additionally or alternatively be associated with an automated protocol, process, sequence, and/or method implemented by the control system 1100 of FIG. 11, including without limitation the various protocols, processes, sequences, and/or methods described below in connection with FIGS. 12-16.

In other examples, the counter 1108 may additionally or alternatively maintain a failure count. For example, the controller 1110 may command and/or instruct the counter 1108 to increment, decrement, and/or reset a failure count maintained by the counter 1108, whereby the failure count corresponds to a number of failed attempts at satisfying a temperature requirement associated with the temperature within the cooking chamber 402 of the pellet grill 100. Based on the failure count maintained by the counter 1108, the controller 1110 can detect whether the failure count has reached and/or exceeded a threshold failure count. In some examples, the threshold failure count may be associated with a predetermined time period. In other examples, the threshold failure count may additionally or alternatively be associated with an automated protocol, process, sequence, and/or method implemented by the control system 1100 of FIG. 11, including without limitation the various protocols, processes, sequences, and/or methods described below in connection with FIGS. 12-16.

The controller 1110 of FIG. 11 can be implemented by any type(s) and/or any number(s) of processor(s), microprocessor(s), controller(s), microcontroller(s), transmitter(s), receiver(s), timer(s), counter(s), circuit(s) and/or other electrical component(s). Although the timer 1106 and the counter 1108 of FIG. 11 are respectively shown as being separate from the controller 1110, in other examples the timer 1106 and/or the counter 1108 can be implemented by and/or integrated within the controller 1110. Although the controller 1110 is shown in FIG. 11 as being a single controller, in other examples the controller 1110 can be implemented as multiple controllers that may be implemented on and/or by one or more control board(s). In the illustrated example of FIG. 11, the controller 1110 is operatively coupled to (e.g., in electrical communication with) the user interface 116, the auger motor 512, the fan 516, the ignitor 704, the temperature sensor 1104, the timer 1106, the counter 1108, and/or the memory 1112 of the control system 1100.

The controller 1110 of FIG. 11 controls and/or manages one or more operation(s) of the user interface 116, the auger motor 512, the fan 516, the ignitor 704, the temperature sensor 1104, the timer 1106, the counter 1108, and/or the memory 1112. In some examples, the controller 1110 receives data, commands and/or signals from, and/or transmit data, commands and/or signals to, the user interface 116, the auger motor 512, the fan 516, the ignitor 704, the temperature sensor 1104, the timer 1106, the counter 1108, and/or the memory 1112 of FIG. 11. In other examples, the controller 1110 wirelessly receives data, commands and/or signals from, and/or wirelessly transmits data, commands and/or signals to, one or more remotely located electronic devices (e.g., a cloud server, a smartphone, a tablet, a laptop computer, a personal computer, etc.).

In some examples, the controller 1110 of FIG. 11 manages and/or controls an ignition-based startup protocol and/or process in connection with the engine 500 of the control system 1100. The controller 1110 is configured to detect the existence of a failed startup, as may be indicated by a failure of the temperature within the cooking chamber 402 of the pellet grill 100 to rise above a threshold temperature prior to the expiration of a predetermined duration and/or time period associated with an initial activation of the ignitor 704 of the engine 500. In some examples, the failed startup is detected based on data that is sensed, measured and/or detected by the temperature sensor 1104 of the control system 1100. In response to detecting the failed startup, the controller 1110 commands the ignitor 704 of the engine 500 to activate (e.g., re-activate) with the intent of causing pellet fuel present in the burn pot 514 of the engine 500 to initiate and/or resume combustion and/or burning.

In some examples, the controller 1110 generates (e.g., in the form of a command, message, signal, etc.) one or more notification(s) and/or alert(s) to be presented locally on the user interface 116 of the control system 1100 and/or the pellet grill 100 in connection with detecting the failed startup. The notification(s) and/or alert(s) may indicate, for example, that the failed startup has been detected, that the failed startup has been remedied successfully, and/or that the failed startup has not been remedied successfully. The controller 1110 can additionally or alternatively cause the generated notification(s) and/or alert(s) to be wirelessly transmitted from the control system 1100 and/or the pellet grill 100 to a remote device (e.g., a cloud server, a smartphone, a tablet, a laptop computer, a personal computer, etc.) for presentation and/or analysis thereon.

In some examples, the controller 1110 of FIG. 11 additionally or alternatively implements, manages and/or controls an ignition-based flame out detection protocol and/or process in connection with the engine 500 of the control system 1100. The controller 1110 is configured to detect the existence of a flame out condition (e.g., an unintended cessation of fuel combustion), as may be indicated by a continually declining temperature within the cooking chamber 402 of the pellet grill 100 over a period of time while the auger 510 of the engine 500 is actively attempting to feed and/or supply pellet fuel to the burn pot 514 of the engine 500. In some examples, the flame out condition is detected based on data that is sensed, measured and/or detected by the temperature sensor 1104 of the control system 1100. In response to detecting the flame out condition, the controller 1110 commands the ignitor 704 of the engine 500 to activate (e.g., re-activate) with the intent of causing pellet fuel present in the burn pot 514 of the engine 500 to resume combustion and/or burning.

In some examples, the controller 1110 generates (e.g., in the form of a command, message, signal, etc.) one or more notification(s) and/or alert(s) to be presented locally on the user interface 116 of the control system 1100 and/or the pellet grill 100 in connection with detecting the flame out condition. The notification(s) and/or alert(s) may indicate, for example, that the flame out condition has been detected, that the flame out condition has been remedied successfully, and/or that the flame out condition has not been remedied successfully. The controller 1110 can additionally or alternatively cause the generated notification(s) and/or alert(s) to be wirelessly transmitted from the control system 1100 and/or the pellet grill 100 to a remote device (e.g., a cloud server, a smartphone, a tablet, a laptop computer, a personal computer, etc.) for presentation and/or analysis thereon.

The memory 1112 of FIG. 11 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 1112 of FIG. 11 can be stored in any file and/or data structure format, organization scheme, and/or arrangement.

The memory 1112 stores data sensed, measured, detected, generated, transmitted, and/or received by the user interface 116, the auger motor 512, the fan 516, the ignitor 704, the temperature sensor 1104, the timer 1106, the counter 1108, and/or the controller 1110 of the control system 1100 of FIG. 11. The memory 1112 also stores instructions (e.g., computer-readable instructions) and associated data corresponding to the protocols, processes, sequences and/or methods described below in connection with FIGS. 12-16. The memory 1112 of FIG. 11 is accessible to one or more of the user interface 116, the auger motor 512, the fan 516, the ignitor 704, the temperature sensor 1104, the timer 1106, the counter 1108, the controller 1110, and/or, more generally, to the control system 1100 of FIG. 11.

While an example manner of implementing the control system 1100 is illustrated in FIG. 11, one or more of the components, elements and/or devices illustrated in FIG. 11 may be combined, divided, re-arranged, omitted, eliminated and/or implemented in any other way. Further, the user interface 116 (including the input device(s) 118 and the output device(s) 120), the engine 500 (including the auger motor 512, the fan 516, and the ignitor 704), the DC power supply 1102, the temperature sensor 1104, the timer 1106, the counter 1108, the controller 1110, the memory 1112, and/or, more generally, the control system 1100 of FIG. 11 may be implemented by hardware, software, firmware and/or any combination of hardware, software and/or firmware. Thus, for example, any of the user interface 116 (including the input device(s) 118 and the output device(s) 120), the DC power supply 1102, the temperature sensor 1104, the timer 1106, the counter 1108, the controller 1110, and/or the memory 1112 of FIG. 11 could be implemented by one or more analog or digital circuit(s), logic circuit(s), programmable processor(s), programmable controller(s), digital signal processor(s), application specific integrated circuit(s), programmable logic device(s), and/or field programmable logic device(s). When reading any of the apparatus or system claims of this patent to cover a purely software and/or firmware implementation, at least one of the controller 1110 and/or the memory 1112 of the control system 1100 of FIG. 11 is/are hereby expressly defined to include a non-transitory computer readable storage device or storage disk such as a memory, a digital versatile disk, a compact disk, a Blu-ray disk, etc. including software and/or firmware. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine-readable instructions, hardware implemented state machines, and/or any combination thereof for implementing the control system 1100 of FIG. 11 are shown in FIGS. 12-16. The machine-readable instructions may be one or more executable program(s) or portion(s) of executable program(s) for execution by one or more processor(s) and/or controller(s). The program(s) may be embodied in software stored on a non-transitory computer readable storage medium such as a hard drive, a flash drive, or a memory associated with the processor(s) and/or controller(s), but the entire program(s) and/or parts thereof could alternatively be executed by a device other than the processor(s) and/or controller(s) and/or embodied in firmware or dedicated hardware. Further, although the example program(s) is/are described with reference to the flowcharts illustrated in FIGS. 12-16, many other methods of implementing the control system 1100 of FIG. 11 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a packaged format, etc. Machine-readable instructions as described herein may be stored as data (e.g., portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example processes of FIGS. 12-16 may be implemented using executable instructions (e.g., computer and/or machine-readable instructions) stored on a non-transitory computer and/or machine-readable medium such as a hard disk drive, a flash memory, a read-only memory, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer-readable medium" is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B.

Figure 12:
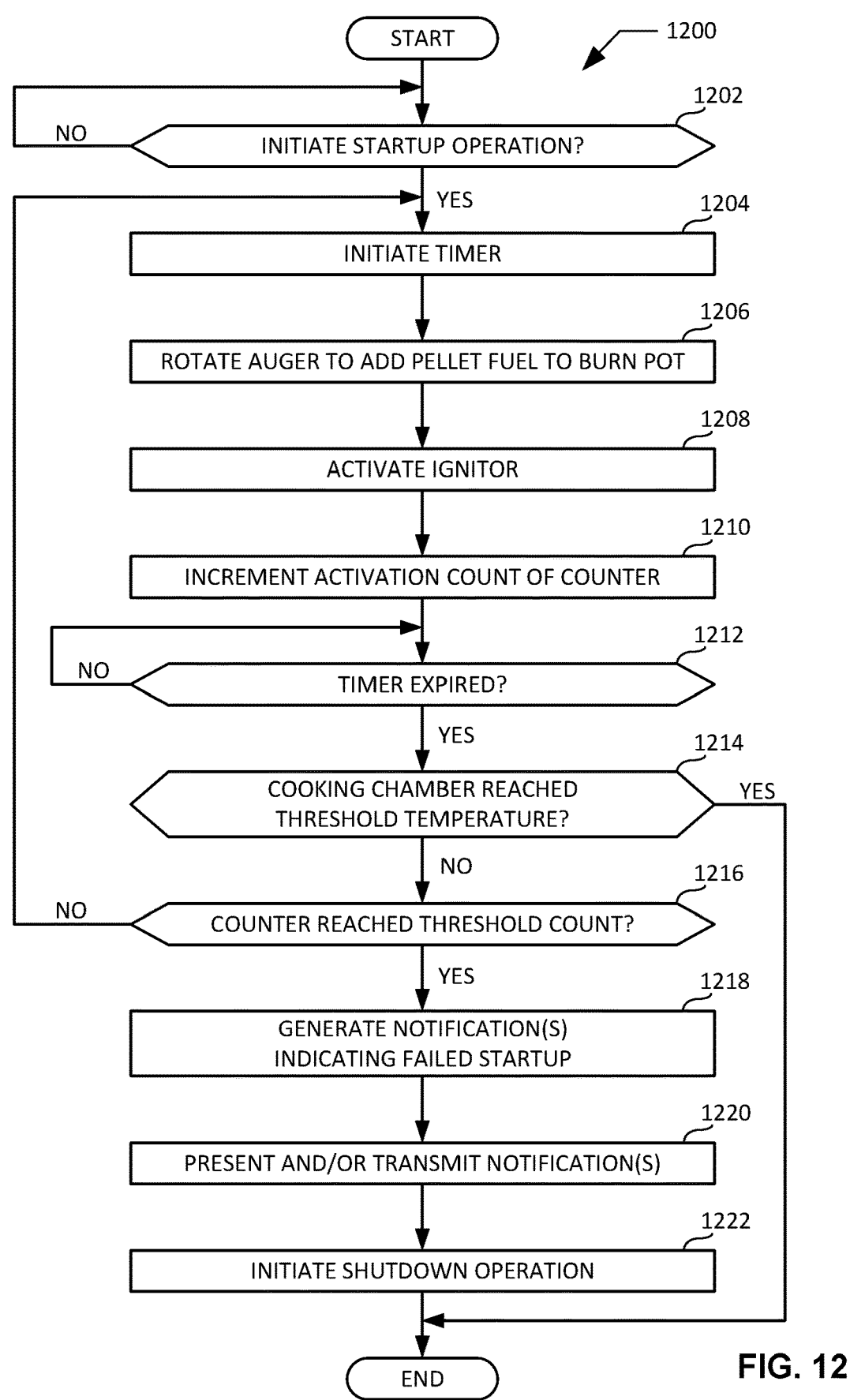
FIG. 12 is a flowchart representative of an example method for implementing a startup protocol and/or process via the control system of FIG. 11.

FIG. 12 is a flowchart representing an example method 1200 for implementing a startup protocol and/or process via the control system 1100 of FIG. 11. The method 1200 of FIG. 12 begins with the control system 1100 determining whether a startup operation (e.g., a startup, preheating, and/or cooking protocol, process, sequence, and/or method) of the pellet grill 100 is to be initiated (block 1202). For example, the control system 1100 may receive (e.g., via the user interface 116) one or more input(s), signal(s), command(s), and/or instruction(s) indicating that a startup operation of the pellet grill 100 is to be initiated. If the control system 1100 determines at block 1202 that a startup operation of the pellet grill 100 is not to be initiated, the method 1200 of FIG. 12 remains at block 1202. If the control system 1100 instead determines at block 1202 that a startup operation of the pellet grill 100 is to be initiated, the method 1200 of FIG. 12 proceeds to block 1204.

At block 1204, the controller 1110 commands (e.g., via one or more signal(s) and/or instruction(s) generated by the controller 1110) the timer 1106 of the control system 1100 to initiate and/or commence measuring and/or maintaining an elapsed time. In some examples, the timer 1106 is reset prior to and/or in conjunction with the execution of block 1204 such that the elapsed time being measured and/or maintained by the timer 1106 has a value of zero when the timer 1106 is initiated. Following block 1204, the method 1200 of FIG. 12 proceeds to block 1206.

At block 1206, the controller 1110 commands (e.g., via one or more signal(s) and/or instruction(s) generated by the controller 1110) the auger motor 512 of the engine 500 to rotate the auger 510 of the engine 500 to add pellet fuel to the burn pot 514 of the engine 500. In some examples, the controller 1110 commands the auger motor 512 of the engine 500 to rotate the auger 510 of the engine for a predetermined time period corresponding to a desired volume of pellet fuel to be added to the burn pot 514 of the engine 500. In some examples, the controller 1110 additionally commands (e.g., via one or more signal(s) and/or instruction(s) generated by the controller 1110) the fan 516 of the engine 500 to operate (e.g., in either a continuous or a pulsed manner) for a predetermined time period. Following block 1206, the method 1200 of FIG. 12 proceeds to block 1208.

At block 1208, the controller 1110 commands (e.g., via one or more signal(s) and/or instruction(s) generated by the controller 1110) the ignitor 704 of the engine 500 to activate. In some examples, the controller 1110 commands the ignitor 704 of the engine 500 to activate for a predetermined time period. Following block 1208, the method 1200 of FIG. 12 proceeds to block 1210.

At block 1210, the controller 1110 commands (e.g., via one or more signal(s) and/or instruction(s) generated by the controller 1110) the counter 1108 of the control system 1100 to increment an activation count being counted and/or maintained by the counter 1108, whereby the activation count corresponds to a number of activations of the ignitor 704. In some examples, the counter 1108 is reset prior to execution of the method 1200 of FIG. 12 such that activation count being counted and/or maintained by the counter 1108 has a specified value (e.g., 0) when block 1210 of the method 1200 is executed for the first time. Following block 1210, the method 1200 of FIG. 12 proceeds to block 1212.

At block 1212, the controller 1110 determines whether the timer 1106 has expired. For example, the controller 1110 can determine whether the elapsed time being measured and/or maintained by the timer 1106 has reached and/or exceeded a threshold duration. If the controller 1110 determines at block 1312 that the timer 1106 has not expired (e.g., that the elapsed time has not reached and/or exceeded the threshold duration), the method 1200 of FIG. 12 remains at block 1212. If the controller 1110 instead determines at block 1212 that the timer 1106 has expired (e.g., that the elapsed time has reached and/or exceeded the threshold duration), the method 1200 of FIG. 12 proceeds to block 1214.

At block 1214, the controller 1110 determines whether the temperature within the cooking chamber 402 has reached and/or exceeded a threshold temperature. For example, the controller 1110 can determine that the temperature within the cooking chamber 402 increased to or beyond a threshold temperature between the initiation (block 1204) and the expiration (block 1212) of the timer 1106 based on data that is sensed and/or measured by the temperature sensor 1104 of the control system 1100 while the timer 1106 is operating. If the controller 1110 determines at block 1214 that the temperature within the cooking chamber 402 has not reached and/or exceeded the threshold temperature, the method 1200 of FIG. 12 proceeds to block 1216. If the controller 1110 instead determines at block 1214 that the temperature within the cooking chamber 402 has reached and/or exceeded the threshold temperature, the method 1200 of FIG. 12 ends.

At block 1216, the controller 1110 determines whether the counter 1108 has reached and/or exceeded a threshold activation count. For example, the controller 1110 can determine whether the activation count being counted and/or maintained by the counter 1108 has reached and/or exceeded a threshold activation count. If the controller 1110 determines at block 1216 that the counter 1108 has not reached and/or exceeded the threshold activation count, the method 1200 of FIG. 12 returns to block 1204. If the controller 1110 instead determines at block 1216 that the counter 1108 has reached and/or exceeded the threshold activation count, the method 1200 of FIG. 12 proceeds to block 1218.

At block 1218, the controller 1110 generates one or more notification(s) and/or alert(s) indicating that the startup operation of the pellet grill 100 has failed. In some examples, the notification(s) and/or alert(s) generated at block 1218 by the controller 1110 are only generated once the controller 1110 and/or, more generally, the control system 1100 of FIG. 11 has made at least one attempt to re-ignite pellet fuel located within the burn pot 514 of the engine 500 by re-activating the ignitor 704 of the engine 500. Following block 1218, the method 1200 of FIG. 12 proceeds to block 1220.

At block 1220, the controller 1110 causes the generated notification(s) and/or alerts(s) (e.g., generated at block 1218) to be presented locally at the user interface 116 of the pellet grill 100. At block 1220, the controller 1110 can additionally or alternatively wirelessly transmit the generated notification(s) and/or alert(s) (e.g., generated at block 1218) from the pellet grill 100 to a remote device (e.g., a cloud server, a smartphone, a tablet, a laptop computer, a personal computer, etc.) for presentation and/or analysis thereon. Following block 1220, the method 1200 of FIG. 12 proceeds to block 1222.

At block 1222, the controller 1110 initiates a shutdown operation (e.g., a shutdown protocol, process, sequence, and/or method) that causes the engine 500 and/or, more generally, the control system 1100 of the pellet grill 100 to cease operating. Following block 1222, the method 1200 of FIG. 12 ends.

Figure 13:
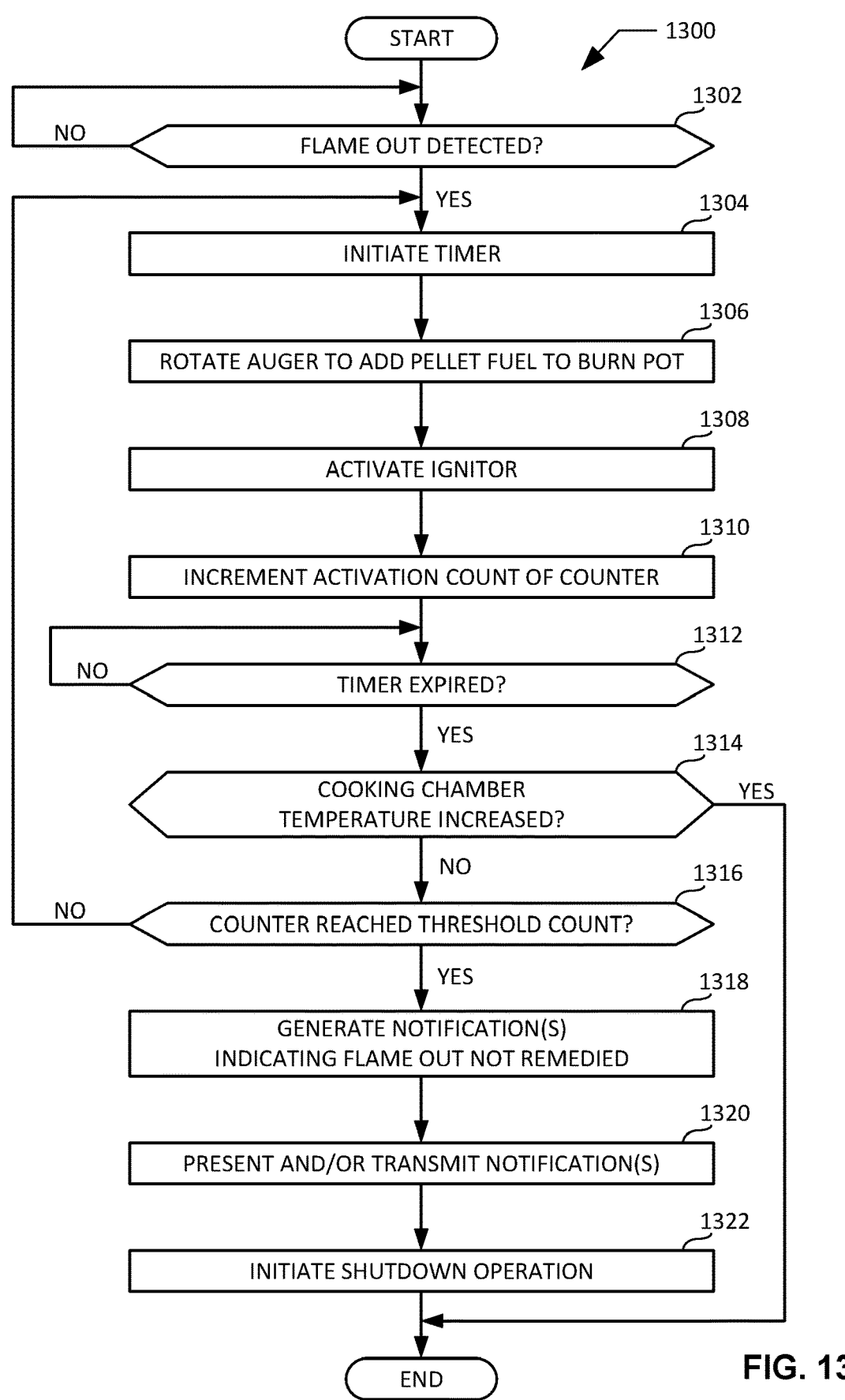
FIG. 13 is a flowchart representative of an example method for implementing a flame out detection protocol and/or process via the control system of FIG. 11.

FIG. 13 is a flowchart representing an example method 1300 for implementing a flame out detection protocol and/or process via the control system 1100 of FIG. 11. The method 1300 of FIG. 13 begins with the controller 1110 of the control system 1100 determining whether a flame out condition of the engine 500 of the pellet grill 100 has been detected (block 1302). For example, the controller 1110 can determine that a flame out condition (e.g., a unintended cessation of fuel combustion) has occurred, as may be indicated by a continually declining temperature of the cooking chamber 402 over a period of time while the auger 510 of the engine 500 is actively attempting to feed and/or supply pellet fuel to the burn pot 514 of the engine 500. In some examples, the flame out condition is detected based on data that is sensed, measured and/or detected by the temperature sensor 1104 of the control system 1100. If the controller 1110 determines at block 1302 that a flame out condition of the engine 500 has not been detected, the method 1300 of FIG. 13 remains at block 1302. If the controller 1110 instead determines at block 1302 that a flame out condition of the engine 500 has been detected, the method 1300 of FIG. 13 proceeds to block 1304.

At block 1304, the controller 1110 commands (e.g., via one or more signal(s) and/or instruction(s) generated by the controller 1110) the timer 1106 of the control system 1100 to initiate and/or commence measuring and/or maintaining an elapsed time. In some examples, the timer 1106 is reset prior to and/or in conjunction with the execution of block 1304 such that the elapsed time being measured and/or maintained by the timer 1106 has a value of zero when the timer 1106 is initiated. Following block 1304, the method 1300 of FIG. 13 proceeds to block 1306.

At block 1306, the controller 1110 commands (e.g., via one or more signal(s) and/or instruction(s) generated by the controller 1110) the auger motor 512 of the engine 500 to rotate the auger 510 of the engine 500 to add pellet fuel to the burn pot 514 of the engine 500. In some examples, the controller 1110 commands the auger motor 512 of the engine 500 to rotate the auger 510 of the engine for a predetermined time period corresponding to a desired volume of pellet fuel to be added to the burn pot 514 of the engine 500. In some examples, the controller 1110 additionally commands (e.g., via one or more signal(s) and/or instruction(s) generated by the controller 1110) the fan 516 of the engine 500 to operate (e.g., in either a continuous or a pulsed manner) for a predetermined time period. Following block 1306, the method 1300 of FIG. 13 proceeds to block 1308.

At block 1308, the controller 1110 commands (e.g., via one or more signal(s) and/or instruction(s) generated by the controller 1110) the ignitor 704 of the engine 500 to activate. In some examples, the controller 1110 commands the ignitor 704 of the engine 500 to activate for a predetermined time period. Following block 1308, the method 1300 of FIG. 13 proceeds to block 1310.

At block 1310, the controller 1110 commands (e.g., via one or more signal(s) and/or instruction(s) generated by the controller 1110) the counter 1108 of the control system 1100 to increment an activation count being counted and/or maintained by the counter 1108, whereby the activation count corresponds to a number of activations of the ignitor 704. In some examples, the counter 1108 is reset prior to execution of the method 1300 of FIG. 13 such that the activation counted being counted and/or maintained by the counter 1108 has a specified value (e.g., 0 or 1) when block 1310 of the method 1300 is executed for the first time. Following block 1310, the method 1300 of FIG. 13 proceeds to block 1312.

At block 1312, the controller 1110 determines whether the timer 1106 has expired. For example, the controller 1110 can determine whether the elapsed time being measured and/or maintained by the timer 1106 has reached and/or exceeded a threshold duration. If the controller 1110 determines at block 1312 that the timer 1106 has not expired (e.g., that the elapsed time has not reached and/or exceeded the threshold duration), the method 1300 of FIG. 13 remains at block 1312. If the controller 1110 instead determines at block 1312 that the timer 1106 has expired (e.g., that the elapsed time has reached and/or exceeded the threshold duration), the method 1300 of FIG. 13 proceeds to block 1314.

At block 1314, the controller 1110 determines whether the temperature within the cooking chamber 402 has increased subsequent to the flame out condition first being detected at block 1302. For example, the controller 1110 can determine that the temperature within the cooking chamber 402 increased between the initiation (block 1304) and the expiration (block 1312) of the timer 1106 based on data that is sensed and/or measured by the temperature sensor 1104 of the control system 1100 while the timer 1106 is operating. If the controller 1110 determines at block 1314 that the temperature within the cooking chamber 402 has not increased, the method 1300 of FIG. 13 proceeds to block 1316. If the controller 1110 instead determines at block 1314 that the temperature within the cooking chamber 402 has increased, the method 1300 of FIG. 13 ends.

At block 1316, the controller 1110 determines whether the counter 1108 has reached and/or exceeded a threshold activation count. For example, the controller 1110 can determine whether the activation count being counted and/or maintained by the counter 1108 has reached and/or exceeded a threshold activation count. If the controller 1110 determines at block 1316 that the counter 1108 has not reached and/or exceeded the threshold activation count, the method 1300 of FIG. 13 returns to block 1304. If the controller 1110 instead determines at block 1316 that the counter 1108 has reached and/or exceeded the threshold activation count, the method 1300 of FIG. 13 proceeds to block 1318.

At block 1318, the controller 1110 generates one or more notification(s) and/or alert(s) indicating that the flame out condition has not been remedied. In some examples, the notification(s) and/or alert(s) generated at block 1318 by the controller 1110 are only generated once the controller 1110 and/or, more generally, the control system 1100 of FIG. 11 has made at least one attempt to re-ignite pellet fuel located within the burn pot 514 of the engine 500 by re-activating the ignitor 704 of the engine 500. Following block 1318, the method 1300 of FIG. 13 proceeds to block 1320.

At block 1320, the controller 1110 causes the generated notification(s) and/or alerts(s) (e.g., generated at block 1318) to be presented locally at the user interface 116 of the pellet grill 100. At block 1320, the controller 1110 can additionally or alternatively wirelessly transmit the generated notification(s) and/or alert(s) (e.g., generated at block 1318) from the pellet grill 100 to a remote device (e.g., a cloud server, a smartphone, a tablet, a laptop computer, a personal computer, etc.) for presentation and/or analysis thereon. Following block 1320, the method 1300 of FIG. 13 proceeds to block 1322.

At block 1322, the controller 1110 initiates a shutdown operation (e.g., a shutdown protocol, process, sequence, and/or method) that causes the engine 500 and/or, more generally, the control system 1100 of the pellet grill 100 to cease operating. Following block 1322, the method 1300 of FIG. 13 ends.

Figure 14A:
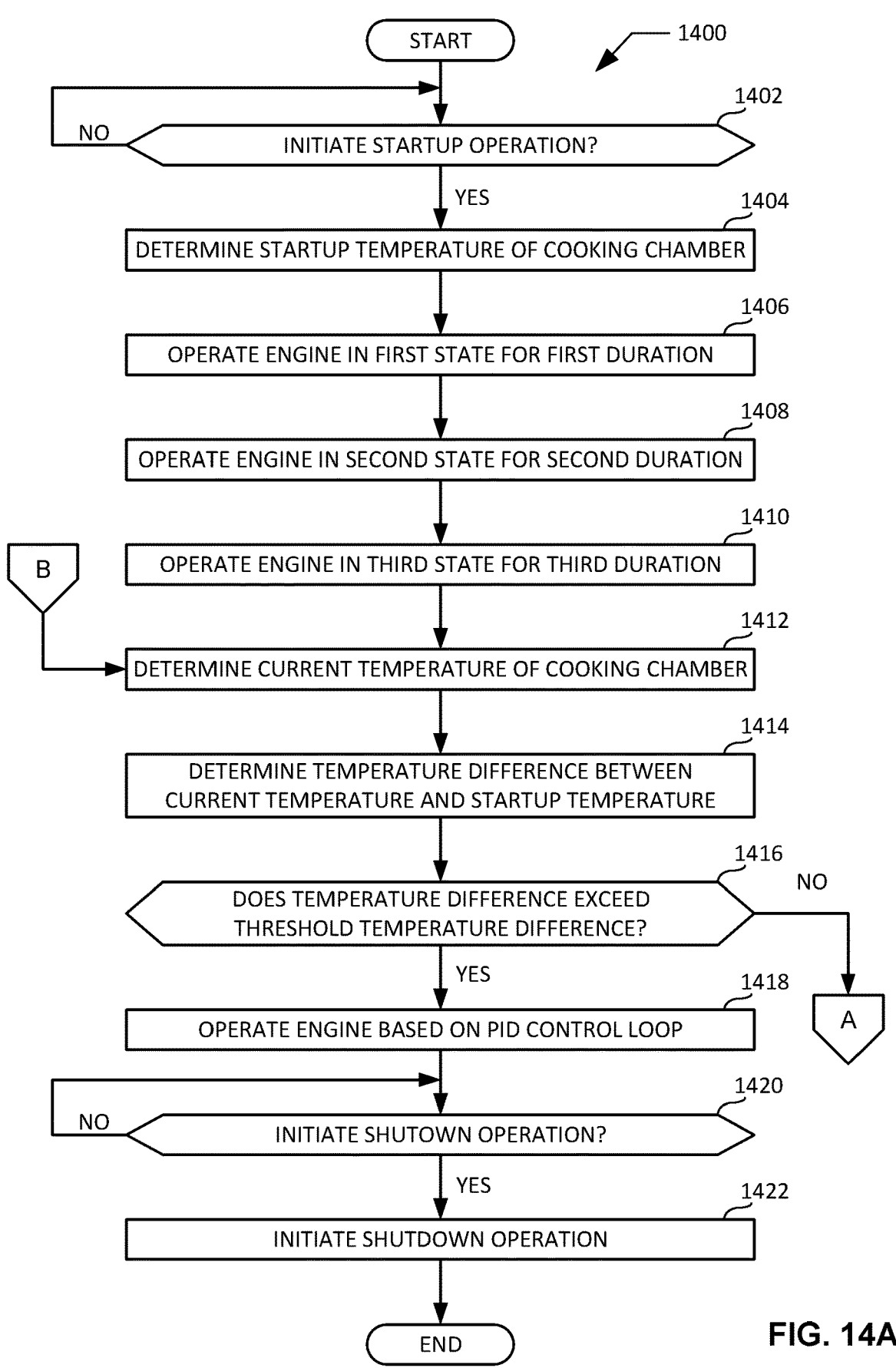
FIGS. 14A and 14B are a flowchart representative of an example method for implementing another ignition-based protocol and/or process via the control system of FIG. 11.
Figure 14B:
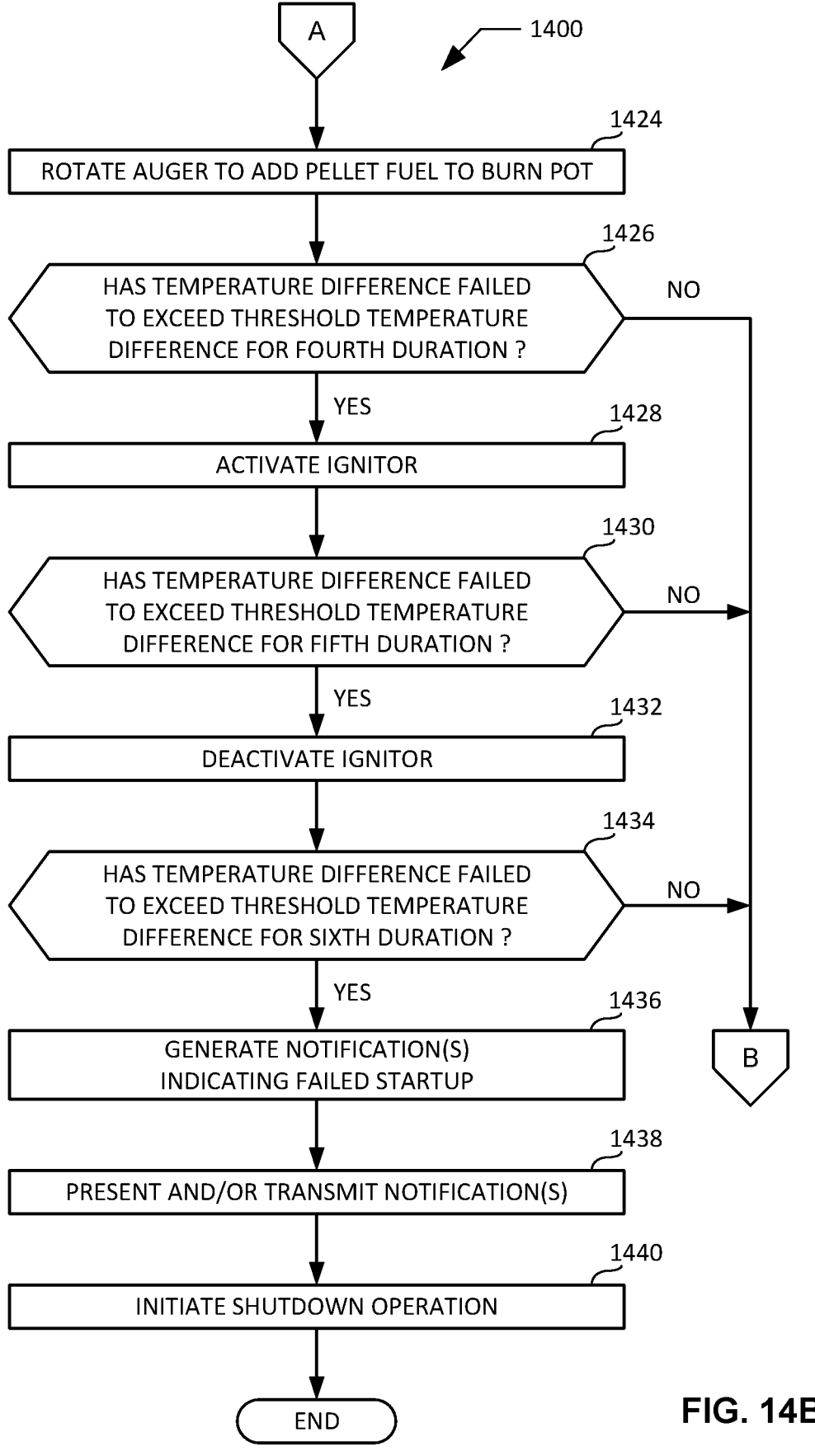

FIGS. 14A and 14B are a flowchart representative of an example method 1400 for implementing another ignition-based protocol and/or process via the control system 1100 of FIG. 11. The method 1400 of FIGS. 14A and 14B begins with the control system 1100 determining whether a startup operation (e.g., a startup, preheating, and/or cooking protocol, process, sequence, and/or method) of the pellet grill 100 is to be initiated (block 1402). For example, the control system 1100 may receive (e.g., via the user interface 116) one or more input(s), signal(s), command(s), and/or instruction(s) indicating that a startup operation of the pellet grill 100 is to be initiated. If the control system 1100 determines at block 1402 that a startup operation of the pellet grill 100 is not to be initiated, the method 1400 of FIGS. 14A and 14B remains at block 1402. If the control system 1100 instead determines at block 1402 that a startup operation of the pellet grill 100 is to be initiated, the method 1400 of FIGS. 14A and 14B proceeds to block 1404.

At block 1404, the controller 1110 determines a starting temperature within the cooking chamber 402. For example, the controller 1110 can determine a starting temperature within the cooking chamber 402 based on data that is sensed and/or measured by the temperature sensor 1104 of the control system 1100 upon initiation of the startup operation. Following block 1404, the method 1400 of FIGS. 14A and 14B proceeds to block 1406.

At block 1406, the controller 1110 commands (e.g., via one or more signal(s) and/or instruction(s) generated by the controller 1110) the engine 500 to operate in a first state for a first duration measured by the timer 1106. In some examples, the first duration is approximately two-hundred seconds. In other examples, the first duration may have a different value (e.g., greater than or less than two-hundred seconds). In some examples, the first state is a first preheating stage. In some examples, the controller 1110 commands the engine 500 to operate in the first state by: (a) commanding the auger motor 512 of the engine 500 to rotate the auger 510 of the engine 500 to add pellet fuel to the burn pot 514 of the engine 500; (b) commanding the fan 516 of the engine 500 to operate (e.g., at a low speed, and in a pulsed manner); and (c) activating the ignitor 704 of the engine. Following block 1406, the method 1400 of FIGS. 14A and 14B proceeds to block 1408.

At block 1408, the controller 1110 commands (e.g., via one or more signal(s) and/or instruction(s) generated by the controller 1110) the engine 500 to operate in a second state for a second duration measured by the timer 1106. In some examples, the second duration is approximately ninety seconds. In other examples, the second duration may have a different value (e.g., greater than or less than ninety seconds). In some examples, the second state is a second preheating stage. In some examples, the controller 1110 commands the engine 500 to operate in the second state by: (a) commanding the auger motor 512 of the engine 500 to cease rotating the auger 510 of the engine 500; (b) commanding the fan 516 of the engine 500 to operate (e.g., at a low speed, and in a continuous manner); and (c) activating the ignitor 704 of the engine. Following block 1408, the method 1400 of FIGS. 14A and 14B proceeds to block 1410.

At block 1410, the controller 1110 commands (e.g., via one or more signal(s) and/or instruction(s) generated by the controller 1110) the engine 500 to operate in a third state for a third duration measured by the timer 1106. In some examples, the third duration is approximately thirty seconds. In other examples, the third duration may have a different value (e.g., greater than or less than thirty seconds). In some examples, the third state is a third preheating stage. In some examples, the controller 1110 commands the engine 500 to operate in the second state by: (a) commanding the auger motor 512 of the engine 500 to cease rotating the auger 510 of the engine 500; (b) commanding the fan 516 of the engine 500 to operate (e.g., at a normal speed, and in a continuous manner); and (c) deactivating the ignitor 704 of the engine. Following block 1410, the method 1400 of FIGS. 14A and 14B proceeds to block 1412.

At block 1412, the controller 1110 determines a current temperature within the cooking chamber 402. For example, the controller 1110 can determine a current temperature within the cooking chamber 402 based on data that is sensed and/or measured by the temperature sensor 1104 of the control system 1100 at and/or near the time that block 1412 of the method 1400 is executed and/or performed. Following block 1412, the method 1400 of FIGS. 14A and 14B proceeds to block 1414.

At block 1414, the controller 1110 determines a temperature difference calculated by subtracting the starting temperature (e.g., determined at block 1404) from the current temperature (e.g., determined at block 1412). Following block 1414, the method 1400 of FIGS. 14A and 14B proceeds to block 1416.

At block 1416, the controller 1110 determines whether the temperature difference exceeds a threshold temperature difference. In some examples, the threshold temperature difference is approximately eighteen degrees Fahrenheit. In other examples, the threshold temperature difference may have a different value (e.g., greater than or less than eighteen degrees Fahrenheit). If the controller 1110 determines at block 1416 that the temperature difference exceeds the threshold temperature difference, the method 1400 of FIGS. 14A and 14B proceeds to block 1418. If the controller 1110 instead determines at block 1416 that the temperature difference does not exceed the threshold temperature difference, the method 1400 of FIGS. 14A and 14 proceeds to block 1424.

At block 1418, the controller 1110 commands (e.g., via one or more signal(s) and/or instruction(s) generated by the controller 1110) the engine 500 to operate based on and/or according to a proportional-integral-derivative (PID) control loop. Following block 1418, the method 1400 of FIGS. 14A and 14B proceeds to block 1420.

At block 1420, the control system 1100 determines whether a shutdown operation (e.g., a shutdown protocol, process, sequence, and/or method) of the pellet grill 100 is to be initiated. For example, the control system 1100 may receive (e.g., via the user interface 116) one or more input(s), signal(s), command(s), and/or instruction(s) indicating that a shutdown operation of the pellet grill 100 is to be initiated. If the control system 1100 determines at block 1420 that a shutdown operation of the pellet grill 100 is not to be initiated, the method 1400 of FIGS. 14A and 14B remains at block 1420. If the control system 1100 instead determines at block 1420 that a shutdown operation of the pellet grill 100 is to be initiated, the method 1400 of FIGS. 14A and 14B proceeds to block 1422.

At block 1422, the controller 1110 initiates a shutdown operation (e.g., a shutdown protocol, process, sequence, and/or method) that causes the engine 500 and/or, more generally, the control system 1100 of the pellet grill 100 to cease operating. Following block 1422, the method 1400 of FIGS. 14A and 14B ends.

At block 1424, the controller 1110 commands (e.g., via one or more signal(s) and/or instruction(s) generated by the controller 1110) the auger motor 512 of the engine 500 to rotate the auger 510 of the engine 500 to add pellet fuel to the burn pot 514 of the engine 500. For example, the controller 1110 may command the auger motor 512 of the engine 500 to rotate the auger 510 of the engine 500 at a low (e.g., minimal) speed. Following block 1424, the method 1400 of FIGS. 14A and 14B proceeds to block 1426.

At block 1426, the controller 1110 determines whether the temperature difference has failed to exceed the threshold temperature difference for a fourth duration measured by the timer 1106. In some examples, the fourth duration is approximately five minutes. In other examples, the fourth duration may have a different value (e.g., greater than or less than five minutes). If the controller 1110 determines at block 1426 that the temperature difference has not failed to exceed the threshold temperature difference for the fourth duration, the method 1400 of FIGS. 14A and 14B returns to block 1412. If the controller 1110 instead determines at block 1426 that the temperature difference has failed to exceed the threshold temperature difference for the fourth duration, the method 1400 of FIGS. 14A and 14 proceeds to block 1428.

At block 1428, the controller 1110 commands (e.g., via one or more signal(s) and/or instruction(s) generated by the controller 1110) the ignitor 704 of the engine 500 to activate (e.g., re-activate). Following block 1428, the method 1400 of FIGS. 14A and 14B proceeds to block 1430.

At block 1430, the controller 1110 determines whether the temperature difference has failed to exceed the threshold temperature difference for a fifth duration measured by the timer 1106. In some examples, the fifth duration is approximately seven minutes. In other examples, the fifth duration may have a different value (e.g., greater than or less than seven minutes) exceeding the value of the fourth duration described above. If the controller 1110 determines at block 1430 that the temperature difference has not failed to exceed the threshold temperature difference for the fifth duration, the method 1400 of FIGS. 14A and 14B returns to block 1412. If the controller 1110 instead determines at block 1430 that the temperature difference has failed to exceed the threshold temperature difference for the fifth duration, the method 1400 of FIGS. 14A and 14 proceeds to block 1432.

At block 1432, the controller 1110 commands (e.g., via one or more signal(s) and/or instruction(s) generated by the controller 1110) the ignitor 704 of the engine 500 to deactivate. Following block 1432, the method 1400 of FIGS. 14A and 14B proceeds to block 1434.

At block 1434, the controller 1110 determines whether the temperature difference has failed to exceed the threshold temperature difference for a sixth duration measured by the timer 1106. In some examples, the sixth duration is approximately fifteen minutes. In other examples, the sixth duration may have a different value (e.g., greater than or less than fifteen minutes) exceeding the value of the fifth duration described above. If the controller 1110 determines at block 1434 that the temperature difference has not failed to exceed the threshold temperature difference for the sixth duration, the method 1400 of FIGS. 14A and 14B returns to block 1412. If the controller 1110 instead determines at block 1430 that the temperature difference has failed to exceed the threshold temperature difference for the sixth duration, the method 1400 of FIGS. 14A and 14 proceeds to block 1436.

At block 1436, the controller 1110 generates one or more notification(s) and/or alert(s) indicating that the startup operation of the pellet grill 100 has failed. In some examples, the notification(s) and/or alert(s) generated at block 1436 by the controller 1110 are only generated once the controller 1110 and/or, more generally, the control system 1100 of FIG. 11 has made at least one attempt to re-ignite pellet fuel located within the burn pot 514 of the engine 500 by re-activating the ignitor 704 of the engine 500. Following block 1436, the method 1400 of FIGS. 14A and 14B proceeds to block 1438.

At block 1438, the controller 1110 causes the generated notification(s) and/or alerts(s) (e.g., generated at block 1436) to be presented locally at the user interface 116 of the pellet grill 100. At block 1438, the controller 1110 can additionally or alternatively wirelessly transmit the generated notification(s) and/or alert(s) (e.g., generated at block 1436) from the pellet grill 100 to a remote device (e.g., a cloud server, a smartphone, a tablet, a laptop computer, a personal computer, etc.) for presentation and/or analysis thereon. Following block 1438, the method 1400 of FIGS. 14A and 14B proceeds to block 1440.

At block 1440, the controller 1110 initiates a shutdown operation (e.g., a shutdown protocol, process, sequence, and/or method) that causes the engine 500 and/or, more generally, the control system 1100 of the pellet grill 100 to cease operating. Following block 1440, the method 1400 of FIGS. 14A and 14B ends.

Figure 15A:
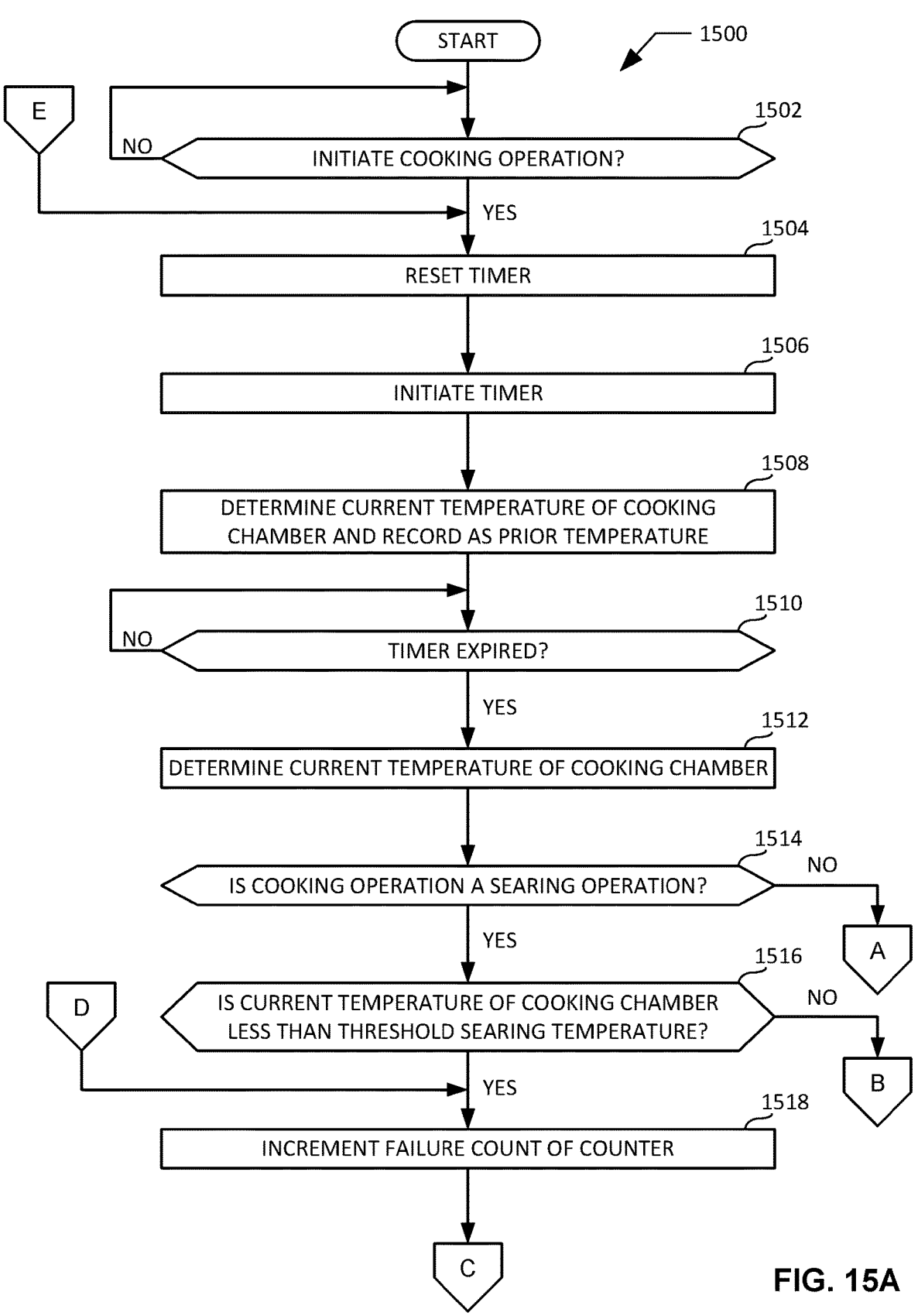
FIGS. 15A-15C are a flowchart representative of an example method for implementing another ignition-based protocol and/or process via the control system of FIG. 11.
Figures 15B, 16:
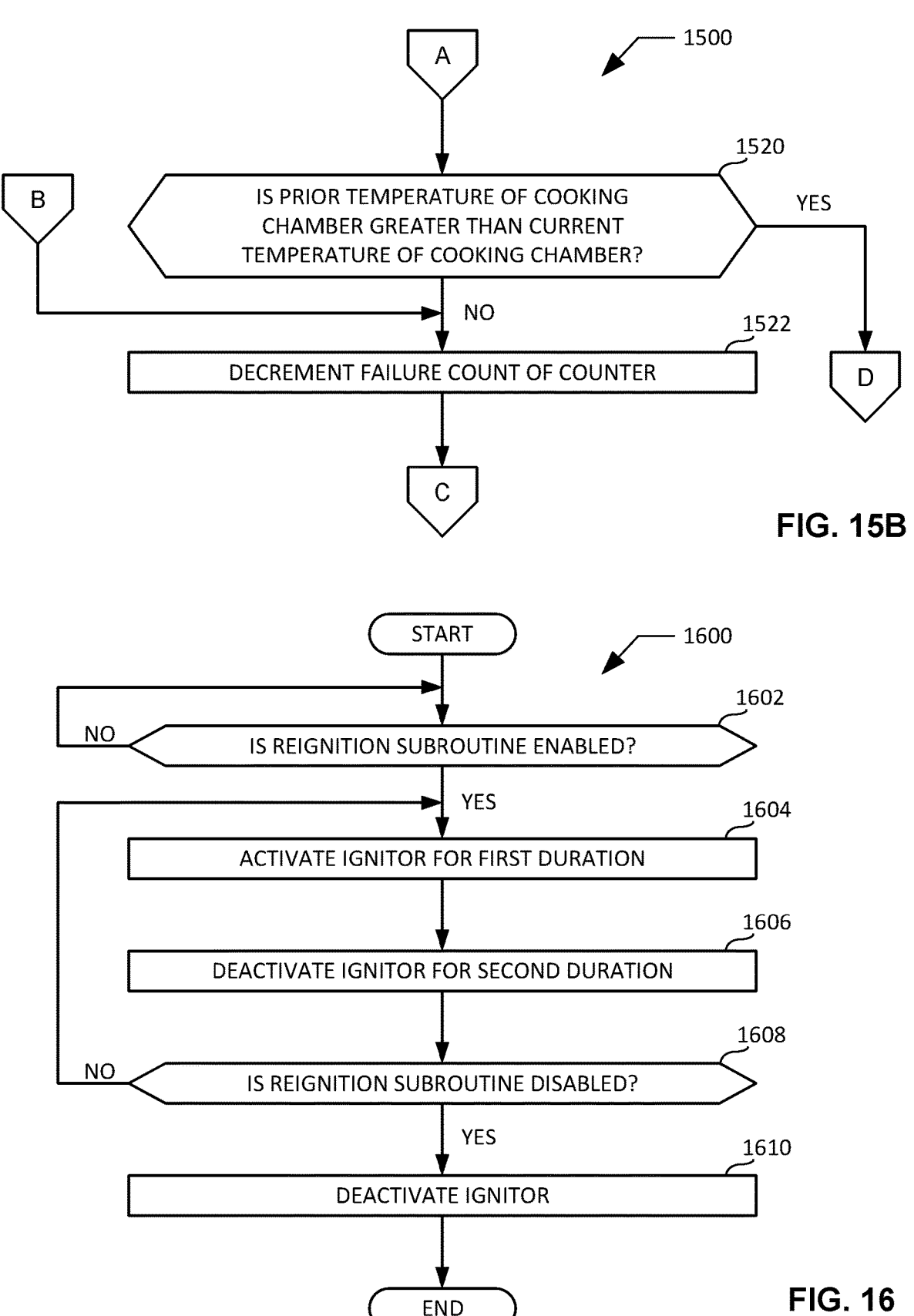
FIG. 16 is a flowchart of an example method for implementing a reignition subroutine via the control system of FIG. 11.
Figure 15C:
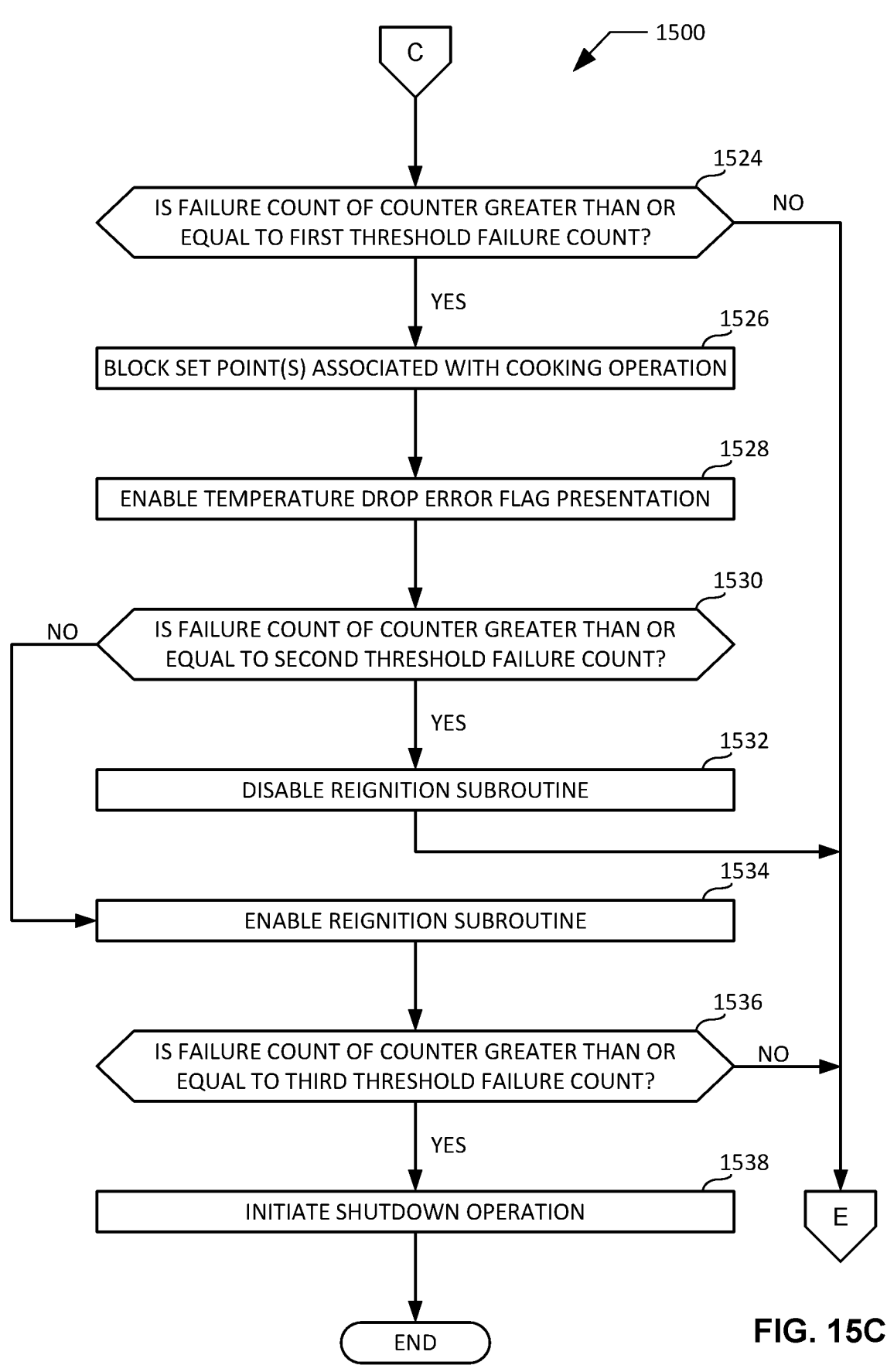

FIGS. 15A-15C are a flowchart representative of an example method for implementing another ignition-based protocol and/or process via the control system of FIG. 11. The method 1500 of FIGS. 15A-15C begins with the control system 1100 determining whether a cooking operation (e.g., a cooking protocol, process, sequence, and/or method) of the pellet grill 100 is to be initiated (block 1502). For example, the control system 1100 may receive (e.g., via the user interface 116) one or more input(s), signal(s), command(s), and/or instruction(s) indicating that a cooking operation of the pellet grill 100 is to be initiated. As another example, the control system 1100 may determine that a cooking operation is to be initiated in response to the control system 1100 successfully completing a startup and/or preheating operation of the pellet grill 100. If the control system 1100 determines at block 1502 that a cooking operation of the pellet grill 100 is not to be initiated, the method 1500 of FIGS. 15A-15C remains at block 1502. If the control system 1100 instead determines at block 1502 that a cooking operation of the pellet grill 100 is to be initiated, the method 1500 of FIGS. 15A-15C proceeds to block 1504.

At block 1504, the controller 1110 commands (e.g., via one or more signal(s) and/or instruction(s) generated by the controller 1110) the timer 1106 of the control system 1100 to reset such that any elapsed time being measured and/or maintained by the timer 1106 has a value of zero when the timer 1106 is initiated. Following block 1504, the method 1500 of FIGS. 15A-15C proceeds to block 1506.

At block 1506, the controller 1110 commands (e.g., via one or more signal(s) and/or instruction(s) generated by the controller 1110) the timer 1106 to initiate and/or commence measuring and/or maintaining an elapsed time. Following block 1506, the method 1500 of FIGS. 15A-15C proceeds to block 1508.

At block 1508, the controller 1110 determines a current temperature within the cooking chamber 402, and records the current temperature as a prior temperature. For example, the controller 1110 can determine a current temperature within the cooking chamber 402 based on data that is sensed and/or measured by the temperature sensor 1104 of the control system 1100 at and/or near the time that block 1508 of the method 1500 is executed and/or performed, and can thereafter record (e.g., via the memory 1112) the current temperature as a prior temperature. Following block 1508, the method 1500 of FIGS. 15A-15C proceeds to block 1510.

At block 1510, the controller 1110 determines whether the timer 1106 has expired. For example, the controller 1110 can determine whether the elapsed time being measured and/or maintained by the timer 1106 has reached and/or exceeded a threshold duration. In some examples, the threshold duration is approximately sixty seconds. In other examples, the threshold duration may have a different value (e.g., greater than or less than sixty seconds). If the controller 1110 determines at block 1510 that the timer 1106 has not expired (e.g., that the elapsed time has not reached and/or exceeded the threshold duration), the method 1500 of FIGS. 15A-15C remains at block 1510. If the controller 1110 instead determines at block 1510 that the timer 1106 has expired (e.g., that the elapsed time has reached and/or exceeded the threshold duration), the method 1500 of FIGS. 15A-15C proceeds to block 1512.

At block 1512, the controller 1110 determines a current temperature within the cooking chamber 402. For example, the controller 1110 can determine a current temperature within the cooking chamber 402 based on data that is sensed and/or measured by the temperature sensor 1104 of the control system 1100 at and/or near the time that block 1512 of the method 1500 is executed and/or performed. Following block 1512, the method 1500 of FIGS. 15A-15C proceeds to block 1514.

At block 1514, the controller 1110 determines whether the cooking operation being implemented by the control system 1100 of the pellet grill is a searing operation. For example, the control system 1100 may receive (e.g., via the user interface 116) one or more input(s), signal(s), command(s), and/or instruction(s) indicating that the cooking operation is a searing operation (e.g., as opposed to a different type of cooking operation, such as a smoking operation). As another example, the control system 1100 may determine that the cooking operation is a searing operation based on the value (e.g., a relatively higher value) of a temperature setpoint associated with the cooking operation (e.g., as opposed to a relatively lower value of a temperature setpoint associated with a different type of cooking operation, such as a smoking operation). If the controller 1110 determines at block 1514 that the cooking operation is a searing operation, the method 1500 of FIGS. 15A-15C proceeds to block 1516. If the controller 1110 instead determines at block 1514 that the cooking operation is not a searing operation, the method 1500 of FIGS. 15A-15C proceeds to block 1520.

At block 1516, the controller 1110 determines whether the current temperature of the cooking chamber 402 is less than a threshold searing temperature. For example, the controller 1110 may determine that the current temperature of the cooking chamber 402 (e.g., determined at block 1512) is less than a threshold searing temperature. If the controller 1110 determines at block 1516 that the current temperature of the cooking chamber 402 is less than the threshold searing temperature, the method 1500 of FIGS. 15A-15C proceeds to block 1518. If the controller 1110 instead determines at block 1516 that the current temperature of the cooking chamber 402 is not less than the threshold searing temperature, the method 1500 of FIGS. 15A-15C proceeds to block 1522.

At block 1518, the controller 1110 commands (e.g., via one or more signal(s) and/or instruction(s) generated by the controller 1110) the counter 1108 of the control system 1100 to increment a failure count being counted and/or maintained by the counter 1108. Following block 1518, the method 1500 of FIGS. 15A-15C proceeds to block 1524.

At block 1520, the controller 1110 determines whether the prior temperature of the cooking chamber 402 is greater than the current temperature of the cooking chamber 402. For example, the controller 1110 may determine that the prior temperature of the cooking chamber 402 (e.g., determined at block 1508) is greater than the current temperature of the cooking chamber 402 (e.g., determined at block 1512). If the controller 1110 determines at block 1520 that the prior temperature of the cooking chamber 402 is not greater than the current temperature of the cooking chamber 402, the method 1500 of FIGS. 15A-15C proceeds to block 1522. If the controller 1110 instead determines at block 1520 that the prior temperature of the cooking chamber 402 is greater than the current temperature of the cooking chamber 402, the method 1500 of FIGS. 15A-15C returns to block 1518.

At block 1522, the controller 1110 commands (e.g., via one or more signal(s) and/or instruction(s) generated by the controller 1110) the counter 1108 to decrement the failure count being counted and/or maintained by the counter 1108. Following block 1522, the method 1500 of FIGS. 15A-15C proceeds to block 1524.

At block 1524, the controller 1110 determines whether the failure count being counted and/or maintained by the counter 1108 is greater than or equal to a first threshold failure count. In some examples, the first threshold failure count may have a value equal to five. In other examples, the first threshold failure count may have a different value (e.g., greater than or less than five). If the controller 1110 determines at block 1524 that the failure count being counted and/or maintained by the counter 1108 is greater than or equal to the first threshold failure count, the method 1500 of FIGS. 15A-15C proceeds to block 1526. If the controller 1110 instead determines at block 1524 that the failure count being counted and/or maintained by the counter 1108 is not greater than or equal to the first threshold failure count, the method 1500 of FIGS. 15A-15C returns to block 1504.

At block 1526, the controller 1110 blocks all set points (e.g., any set point(s) associated with the cooking operation). In some examples, the controller 1110 maintains the set point blocking operation implemented at block 1526 until the failure count being counted and/or maintained by the counter 1108 returns to a value that is less than the first threshold failure count. Following block 1526, the method 1500 of FIGS. 15A-15C proceeds to block 1528.

At block 1528, the controller 1110 enables the presentation of an error flag (e.g., a temperature drop error flag, a flame out condition error flag, etc.) via the user interface 116 of the control system 1100 of the pellet grill 100. In some examples, the controller 1110 may cause the enabled error flag to be presented locally at the user interface 116 of the pellet grill 100. In other examples, the controller 1110 may additionally or alternatively cause the enabled error flag to be wirelessly transmitted from the pellet grill 100 to a remote device (e.g., a cloud server, a smartphone, a tablet, a laptop computer, a personal computer, etc.) for presentation and/or analysis thereon.

At block 1530, the controller 1110 determines whether the failure count being counted and/or maintained by the counter 1108 is greater than or equal to a second threshold failure count. In some examples, the second threshold failure count may have a value equal to six. In other examples, the second threshold failure count may have a different value (e.g., greater than or less than six) greater than the first threshold failure count. If the controller 1110 determines at block 1530 that the failure count being counted and/or maintained by the counter 1108 is greater than or equal to the second threshold failure count, the method 1500 of FIGS. 15A-15C proceeds to block 1532. If the controller 1110 instead determines at block 1530 that the failure count being counted and/or maintained by the counter 1108 is not greater than or equal to the second threshold failure count, the method 1500 of FIGS. 15A-15C proceeds to block 1534.

At block 1532, the controller 1110 disenables a reignition subroutine. An example reignition subroutine that may be implemented by the control system 1100 of FIG. 11 in connection with block 1532 and/or, more generally, in connection with the method 1500 of FIGS. 15A-15C is further described below in connection with FIG. 16. Following block 1532, the method 1500 of FIGS. 15A-15C returns to block 1504.

At block 1534, the controller 1110 enables the reignition subroutine. An example reignition subroutine that may be implemented by the control system 1100 of FIG. 11 in connection with block 1534 and/or, more generally, in connection with the method 1500 of FIGS. 15A-15C is further described below in connection with FIG. 16. Following block 1534, the method 1500 of FIGS. 15A-15C proceeds to block 1536.

At block 1536, the controller 1110 determines whether the failure count being counted and/or maintained by the counter 1108 is greater than or equal to a third threshold failure count. In some examples, the third threshold failure count may have a value equal to twenty. In other examples, the third threshold failure count may have a different value (e.g., greater than or less than twenty) greater than the second threshold failure count. If the controller 1110 determines at block 1536 that the failure count being counted and/or maintained by the counter 1108 is greater than or equal to the third threshold failure count, the method 1500 of FIGS. 15A-15C proceeds to block 1538. If the controller 1110 instead determines at block 1536 that the failure count being counted and/or maintained by the counter 1108 is not greater than or equal to the third threshold failure count, the method 1500 of FIGS. 15A-15C returns to block 1504.

At block 1538, the controller 1110 initiates a shutdown operation (e.g., a shutdown protocol, process, sequence, and/or method) that causes the engine 500 and/or, more generally, the control system 1100 of the pellet grill 100 to cease operating. Following block 1538, the method 1500 of FIGS. 15A-15C ends.

FIG. 16 is a flowchart of an example method 1600 for implementing a reignition subroutine via the control system 1100 of FIG. 11. The method 1600 of FIG. 16 can be implemented in connection with the method 1500 of FIGS. 15A-15C described above. The method 1600 of FIG. 16 begins with the controller 1110 of the control system 1100 determining whether the reignition subroutine has been enabled (block 1602). For example, the controller 1110 may determine that the reignition subroutine has been enabled in response to the controller 1110 performing block 1534 of the method 1500 of FIGS. 15A-15C described above. If the controller 1110 determines at block 1602 that the ignition subroutine has not been enabled, the method 1600 of FIG. 16 remains at block 1602. If the control system 1100 instead determines at block 1602 that the ignition subroutine has been enabled, the method 1600 of FIG. 16 proceeds to block 1604.

At block 1604, the controller 1110 commands (e.g., via one or more signal(s) and/or instruction(s) generated by the controller 1110) the ignitor 704 of the engine 500 to activate for a first duration measured by the timer 1106. In some examples, the first duration is approximately one-hundred-eighty seconds. In other examples, the first duration may have a different value (e.g., greater than or less than one-hundred-eighty seconds). Following block 1604, the method 1600 of FIG. 16 proceeds to block 1606.

At block 1606, the controller 1110 commands (e.g., via one or more signal(s) and/or instruction(s) generated by the controller 1110) the ignitor 704 of the engine 500 to deactivate for a second duration measured by the timer 1106. In some examples, the second duration is approximately sixty seconds. In other examples, the second duration may have a different value (e.g., greater than or less than sixty seconds). Following block 1606, the method 1600 of FIG. 16 proceeds to block 1608.

At block 1608, the controller 1110 of the control system 1100 determines whether the reignition subroutine has been disabled (block 1608). For example, the controller 1110 may determine that the reignition subroutine has been disabled in response to the controller 1110 performing block 1532 of the method 1500 of FIGS. 15A-15C described above. If the controller 1110 determines at block 1608 that the ignition subroutine has not been disabled, the method 1600 of FIG. 16 returns to block 1404. If the control system 1100 instead determines at block 1608 that the ignition subroutine has been disabled, the method 1600 of FIG. 16 proceeds to block 1610.

At block 1610, the controller 1110 commands (e.g., via one or more signal(s) and/or instruction(s) generated by the controller 1110) the ignitor 704 of the engine 500 to deactivate. Following block 1610, the method 1600 of FIG. 16 ends.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pellet grill, comprising:
a cooking chamber;
a burn pot;
an ignitor extending into the burn pot and configured to ignite pellet fuel located within the burn pot; and a controller configured to:

detect a temperature pattern of the cooking chamber corresponding to a flame out condition of the burn pot;

in response to detecting the temperature pattern, command the ignitor to activate during a first duration;

following expiration of the first duration, determine whether a temperature of the cooking chamber increased during the first duration; and in response to determining that the temperature has not increased during the first duration, command the ignitor to activate during a second duration.

2. The pellet grill of claim 1, wherein the ignitor is a DC-powered glow plug.

3. The pellet grill of claim 1, wherein the controller is further configured to:

command a counter to increment an activation count in response to the respective activations of the ignitor;

determine whether the activation count has reached a threshold activation count; and in response to determining that the activation count has reached the threshold activation count, generate a notification indicating at least one of an occurrence of the flame out condition, a failure to remedy the flame out condition, or an initiation of a shutdown operation associated with an engine of the pellet grill.

4. The pellet grill of claim 3, wherein the controller is further configured to cause the notification to be presented at a user interface of the pellet grill.

5. The pellet grill of claim 3, wherein the controller is further configured to cause the notification to be wirelessly transmitted from the pellet grill to a device located remotely from the pellet grill.

6. The pellet grill of claim 1, wherein the controller is further configured to:

command a counter to increment an activation count in response to the respective activations of the ignitor;

determine whether the activation count has reached a threshold activation count; and in response to determining that the activation count has reached the threshold activation count, initiate a shutdown operation associated with an engine of the pellet grill.

7. The pellet grill of claim 1, wherein the controller is further configured to command an auger motor of the pellet grill to rotate an auger of the pellet grill during the first duration, the rotation of the auger to cause pellet fuel to be added to the burn pot during the first duration.

8. The pellet grill of claim 1, wherein the controller is further configured to:

command a timer to initiate measurement of an elapsed time associated with the first duration;

determine whether the elapsed time exceeds a threshold duration associated with the first duration; and in response to determining that the elapsed time exceeds the threshold duration, determine that the first duration has expired.

9. A method for implementing an ignition-based protocol of a pellet grill, the method comprising:

detecting, via a controller of the pellet grill, a temperature pattern of a cooking chamber of the pellet grill corresponding to a flame out condition of a burn pot of the pellet grill;

in response to detecting the temperature pattern, commanding, via the controller, an ignitor of the pellet grill to activate during a first duration, the ignitor extending into the burn pot and configured to ignite pellet fuel located within the burn pot;

following expiration of the first duration, determining, via the controller, whether a temperature of the cooking chamber increased during the first duration; and in response to determining that the temperature has not increased during the first duration, commanding, via the controller, the ignitor to activate during a second duration.

10. The method of claim 9, further comprising:

commanding, via the controller, a counter to increment an activation count in response to the respective activations of the ignitor;

determining, via the controller, whether the activation count has reached a threshold activation count; and in response to determining that the activation count has reached the threshold activation count, generating, via the controller, a notification indicating at least one of an occurrence of the flame out condition, a failure to remedy the flame out condition, or an initiation of a shutdown operation associated with an engine of the pellet grill.

11. The method of claim 10, further comprising causing, via the controller, the notification to be at least one of (a) presented at a user interface of the pellet grill or (b) wirelessly transmitted from the pellet grill to a device located remotely from the pellet grill.

12. The method of claim 9, further comprising:

commanding, via the controller, a counter to increment an activation count in response to the respective activations of the ignitor;

determining, via the controller, whether the activation count has reached a threshold activation count; and in response to determining that the activation count has reached the threshold activation count, initiating, via the controller, a shutdown operation associated with an engine of the pellet grill.

13. The method of claim 9, further comprising commanding, via the controller, an auger motor of the pellet grill to rotate an auger of the pellet grill during the first duration, the rotation of the auger to cause pellet fuel to be added to the burn pot during the first duration.

14. The method of claim 9, further comprising:

commanding, via the controller, a timer to initiate measurement of an elapsed time associated with the first duration;

determining, via the controller, whether the elapsed time exceeds a threshold duration associated with the first duration; and in response to determining that the elapsed time exceeds the threshold duration, determining, via the controller, that the first duration has expired.

15. A non-transitory computer-readable storage medium of a pellet grill, the pellet grill further including a controller, a cooking chamber, a burn pot, and an ignitor, the ignitor extending into the burn pot and configured to ignite pellet fuel located within the burn pot, the non-transitory computer-readable storage medium comprising instructions that, when executed, cause the controller to at least:

detect a temperature pattern of the cooking chamber corresponding to a flame out condition of the burn pot;

in response to detecting the temperature pattern, command the ignitor to activate during a first duration;

following expiration of the first duration, determine whether a temperature of the cooking chamber increased during the first duration; and

in response to determining that the temperature has not increased during the first duration, command the ignitor to activate during a second duration.

16. The non-transitory computer-readable storage medium of claim 15, wherein the instructions, when executed, cause the controller to:

command a counter to increment an activation count in response to the respective activations of the ignitor;

determine whether the activation count has reached a threshold activation count; and in response to determining that the activation count has reached the threshold activation count, generate a notification indicating at least one of an occurrence of the flame out condition, a failure to remedy the flame out condition, or an initiation of a shutdown operation associated with an engine of the pellet grill.

17. The non-transitory computer-readable storage medium of claim 16, wherein the instructions, when executed, cause the controller to cause the notification to be at least one of (a) presented at a user interface of the pellet grill or (b) wirelessly transmitted from the pellet grill to a device located remotely from the pellet grill.

18. The non-transitory computer-readable storage medium of claim 15, wherein the instructions, when executed, cause the controller to:

command a counter to increment an activation count in response to the respective activations of the ignitor;

determine whether the activation count has reached the threshold activation count; and in response to determining that the activation count has reached a threshold activation count, initiate a shutdown operation associated with an engine of the pellet grill.

19. The non-transitory computer-readable storage medium of claim 15, wherein the instructions, when executed, cause the controller to command an auger motor of the pellet grill to rotate an auger of the pellet grill during the first duration, the rotation of the auger to cause pellet fuel to be added to the burn pot during the first duration.

20. The non-transitory computer-readable storage medium of claim 15, wherein the instructions, when executed, cause the controller to:

command a timer to initiate measurement of an elapsed time associated with the first duration;

determine whether the elapsed time exceeds a threshold duration associated with the first duration; and in response to determining that the elapsed time exceeds the threshold duration, determine that the first duration has expired.

* * * * *